US012656453B2

(12) United States Patent
Sekiya

(10) Patent No.: US 12,656,453 B2
(45) Date of Patent: Jun. 16, 2026

(54) RADAR SYSTEM

(71) Applicant: KABUSHIKI KAISHA TOSHIBA,
Tokyo (JP)

(72) Inventor: Ryota Sekiya, Kamakura Kanagawa
(JP)

(73) Assignee: KABUSHIKI KAISHA TOSHIBA,
Kawasaki (JP)

( * ) Notice: Subject to any disclaimer, the term of this
patent is extended or adjusted under 35
U.S.C. 154(b) by 298 days.

(21) Appl. No.: 18/459,364

(22) Filed: Aug. 31, 2023

(65) Prior Publication Data

US 2024/0219517 A1 Jul. 4, 2024

(30) Foreign Application Priority Data

Jan. 4, 2023 (JP) ................................. 2023-000237

(51) Int. Cl.
G01S 7/35 (2006.01)
G01S 13/32 (2006.01)
G01S 13/90 (2006.01)
(52) U.S. Cl.
CPC .............. G01S 7/354 (2013.01); G01S 13/32
(2013.01); G01S 13/9021 (2019.05)
(58) Field of Classification Search
None
See application file for complete search history.

(56) References Cited

U.S. PATENT DOCUMENTS 5,717,399 A 2/1998 Urabe et al.
7,535,409 B1* 5/2009 Choe ........................ H01Q 3/40
342/368

2006/0164294 A1 7/2006 Gottwald et al.
2011/0140949 A1* 6/2011 Lee ...................... H01Q 21/061
342/107
2012/0274499 A1* 11/2012 Chang ....................... G01S 7/42
342/107

(Continued)

FOREIGN PATENT DOCUMENTS

DE 102016215437 A1 2/2018
EP 3839560 A1 6/2021

(Continued)

OTHER PUBLICATIONS

Extended European Search Report (EESR) dated Feb. 19, 2024,
issued in counterpart European Application No. 23195087.4.

(Continued)

*Primary Examiner* — Bernarr E Gregory

(74) *Attorney, Agent, or Firm* — Holtz, Holtz & Volek PC

(57) ABSTRACT

According to one embodiment, a radar system includes a
plurality of antennas, and a processor configured to drive the
antennas. In a case of driving the antennas in a first mode,
the processor is configured to cause the antennas to be
cooperatively operated, and image an object based on radar
echoes received by the antennas. In a case of driving the
antennas in a second mode, the processor is configured to
cause a first antenna group to be cooperatively operated,
image the object based on radar echoes received in the first
antenna group, cause a second antenna group to be coop-
eratively operated, and image the object based on radar
echoes received in the second antenna group. The second
antenna group is different from the first antenna group.

11 Claims, 17 Drawing Sheets

(56) References Cited

U.S. PATENT DOCUMENTS

| | | | | |
|---|---|---|---|---|
| 2014/0306840 A1* | 10/2014 | Koerber | ............... | G01S 13/422 |
| | | | | 342/107 |
| 2015/0285898 A1* | 10/2015 | Testar | .................. | G01S 7/4008 |
| | | | | 342/175 |
| 2016/0291148 A1* | 10/2016 | Ellenbogen | ........... | G01S 13/887 |
| 2017/0276786 A1* | 9/2017 | Smith | ................ | G01S 13/9021 |
| 2019/0219685 A1 | 7/2019 | Shan | | |
| 2020/0185830 A1* | 6/2020 | West | ................... | H01Q 3/2682 |
| 2020/0271751 A1* | 8/2020 | Mayer | ..................... | G01S 7/411 |
| 2021/0124011 A1 | 4/2021 | Madhow et al. | | |
| 2023/0039504 A1 | 2/2023 | Kitamura et al. | | |

FOREIGN PATENT DOCUMENTS

| | | | |
|---|---|---|---|
| EP | 4166984 | A1 | 4/2023 |
| JP | 2009128019 | A | 6/2009 |
| JP | 4954032 | B2 | 3/2012 |
| JP | 2017223575 | A | 12/2017 |
| WO | 2021250866 | A1 | 12/2021 |
| WO | 2022002004 | A1 | 1/2022 |

OTHER PUBLICATIONS

Japanese Office Action (and an English language translation thereof) dated Mar. 10, 2026, issued in corresponding Japanese Application No. 2023-000237.

\* cited by examiner

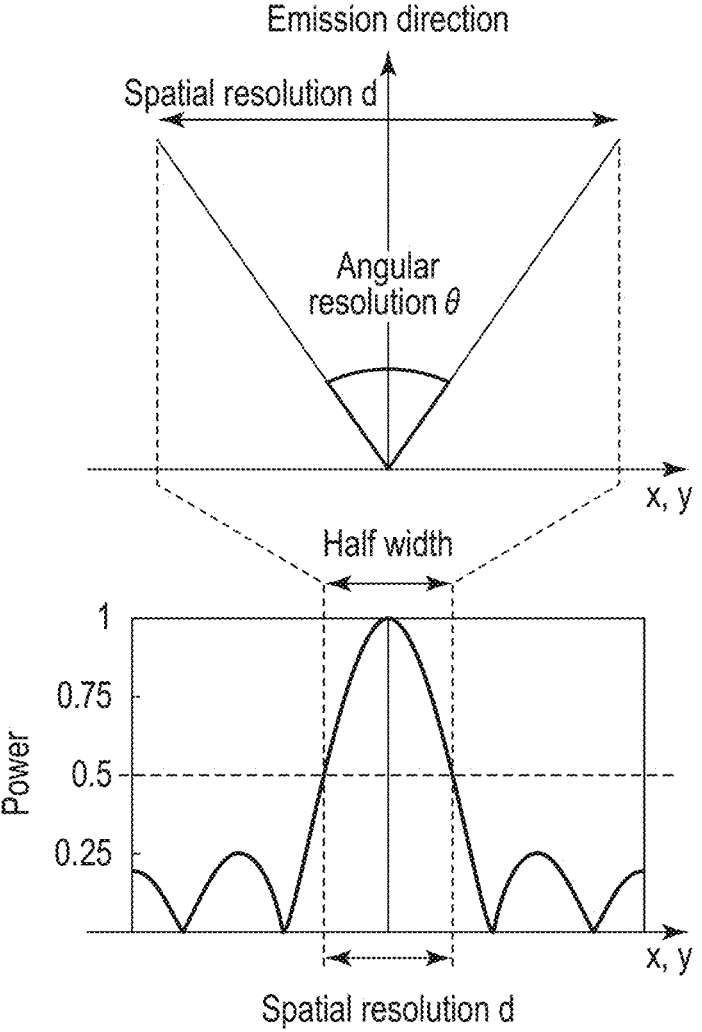
F I G. 3

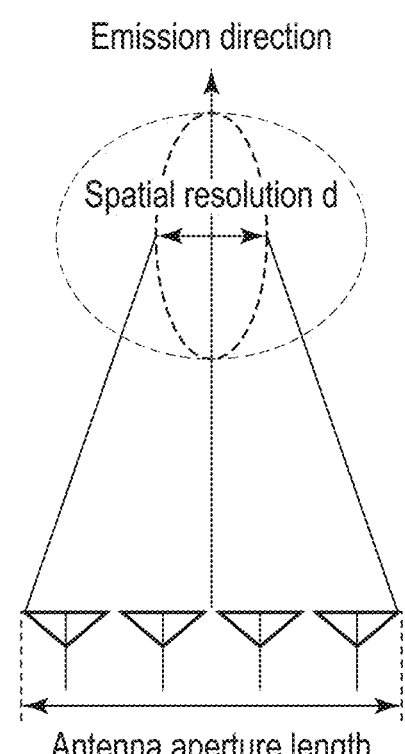
Emission direction
Spatial resolution d
Antenna aperture length
F I G. 4
Emission direction
Spatial resolution d
Antenna aperture length
F I G. 5

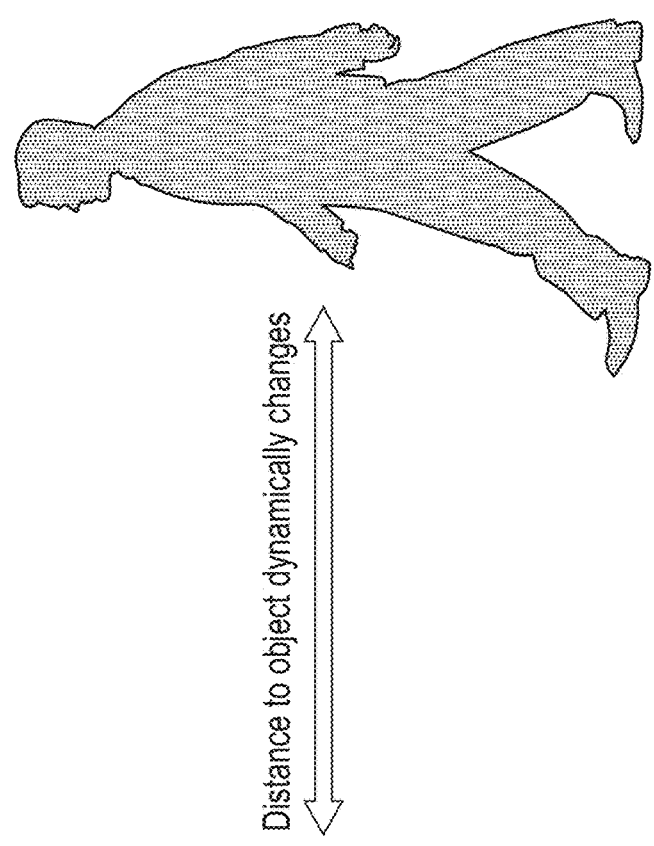
Distance to object dynamically changes
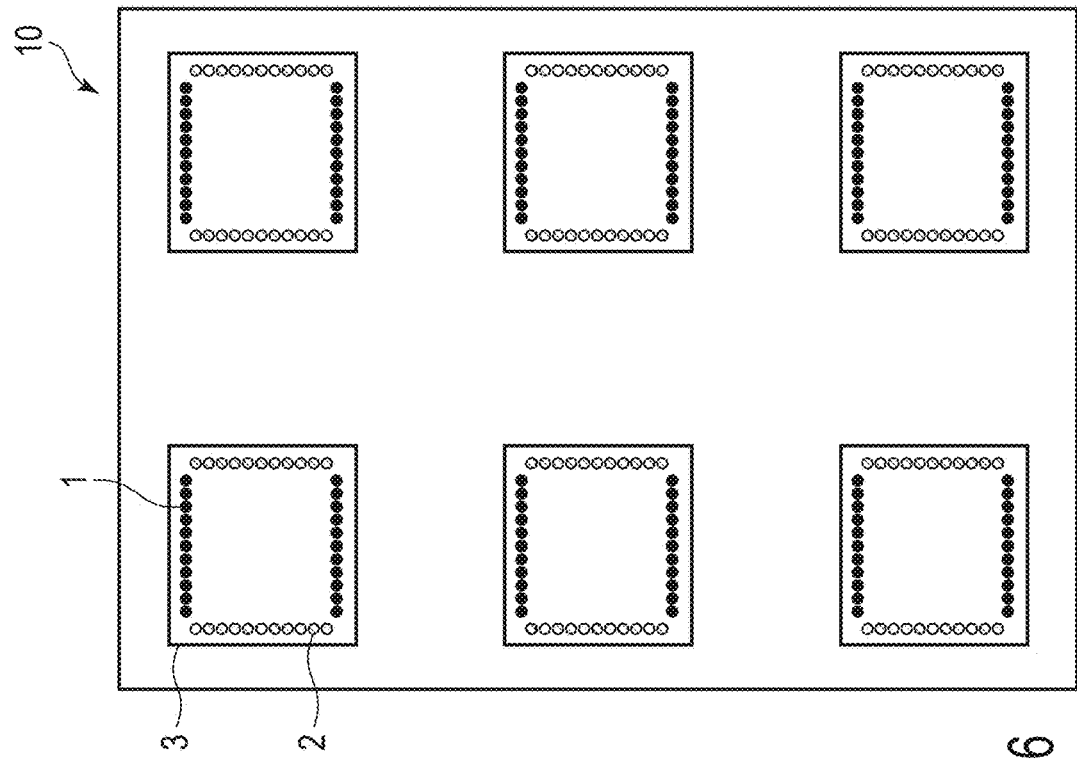
F I G. 6

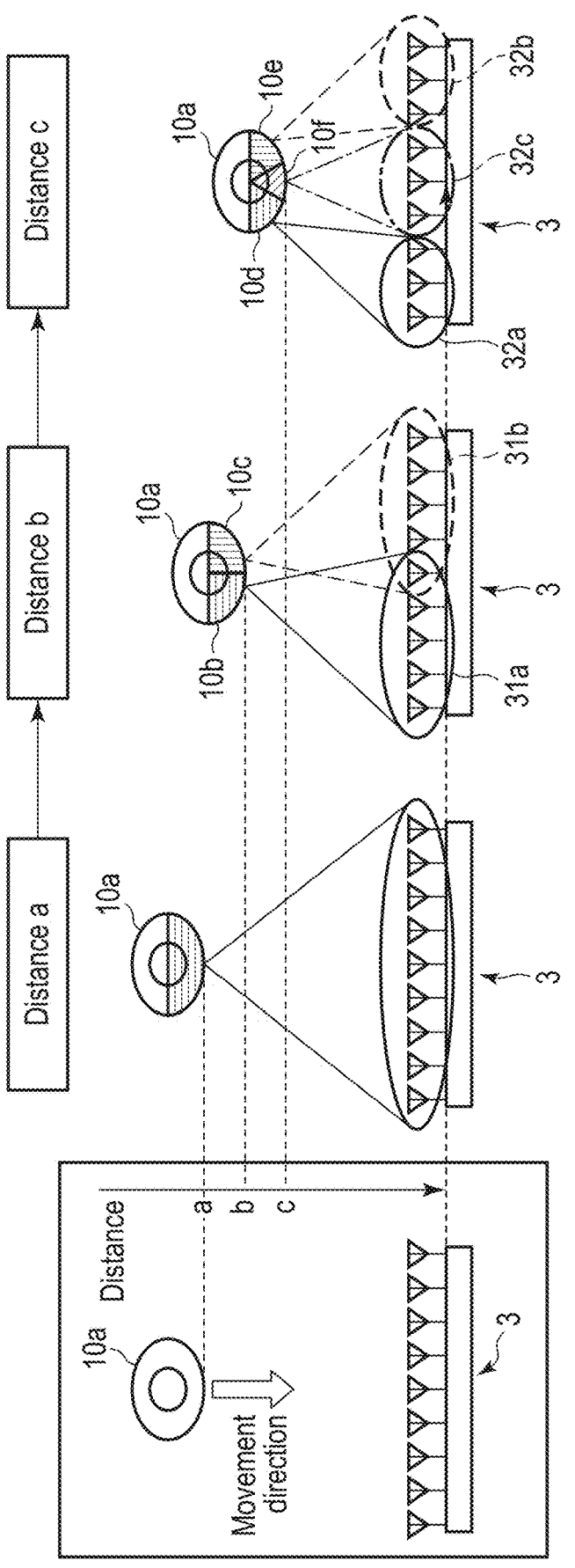
F I G. 9

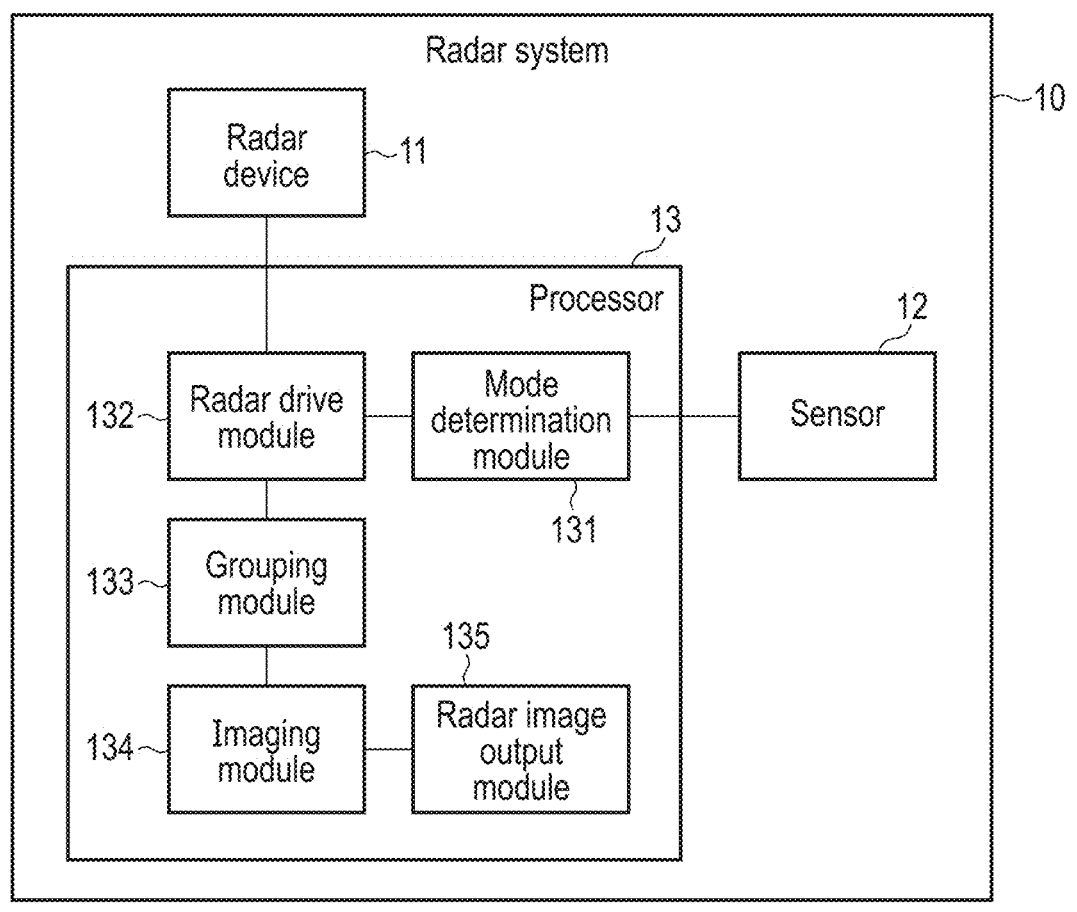
F I G. 10

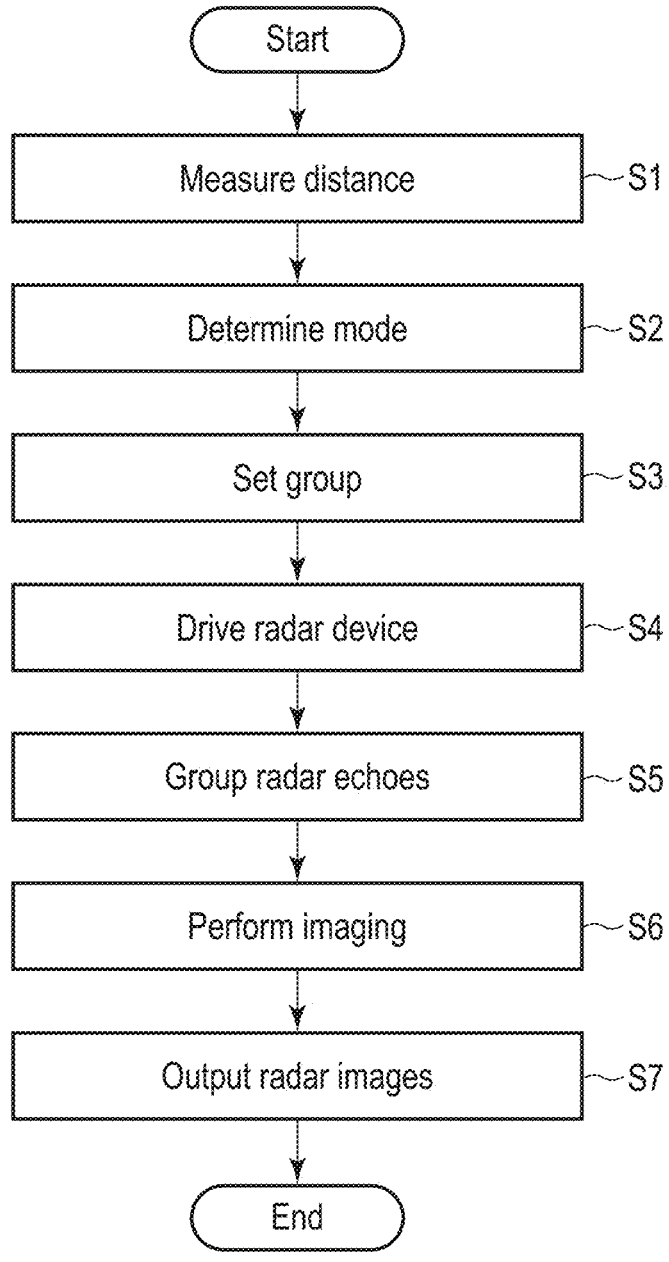
F I G. 11

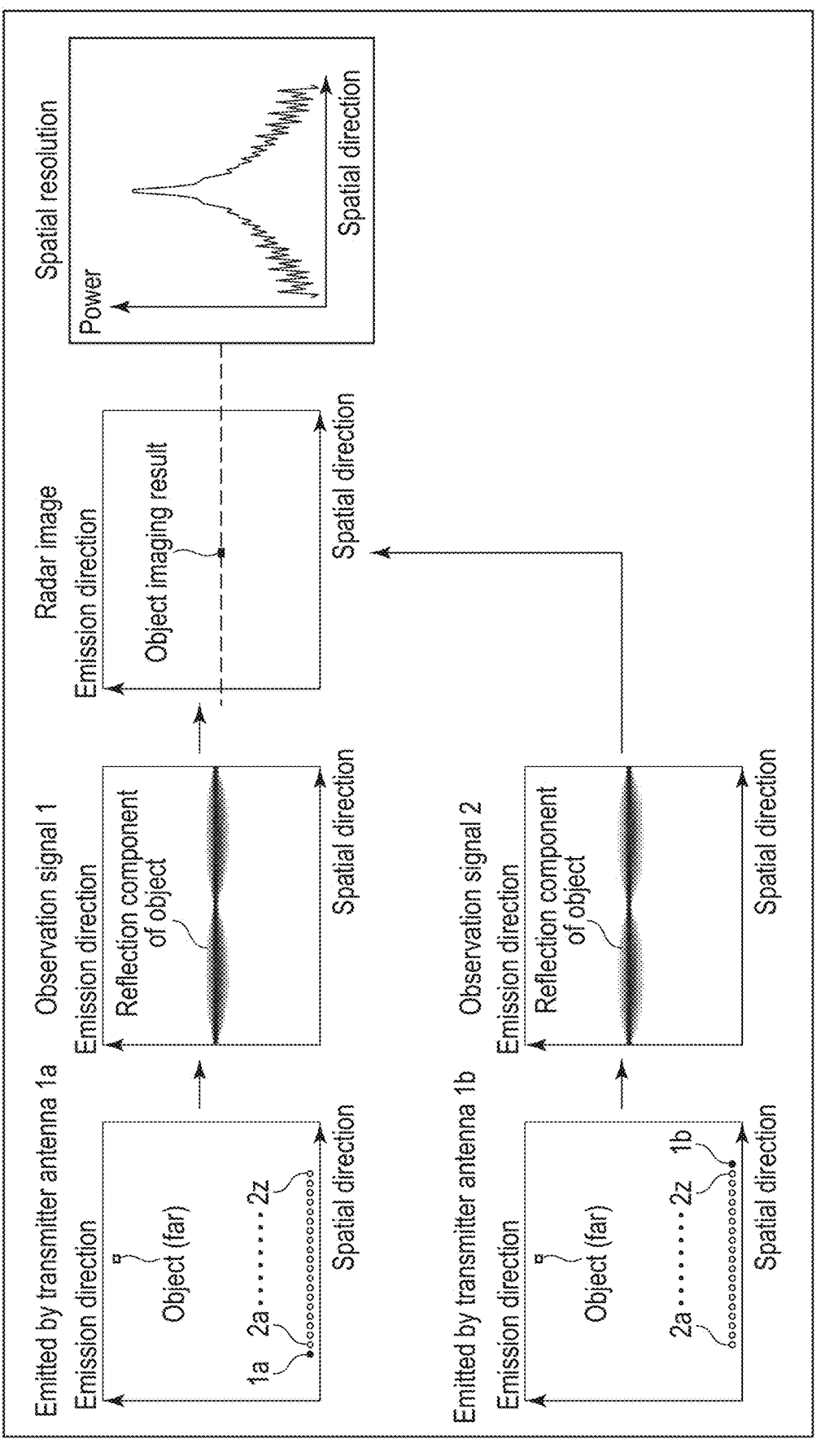
F I G. 13

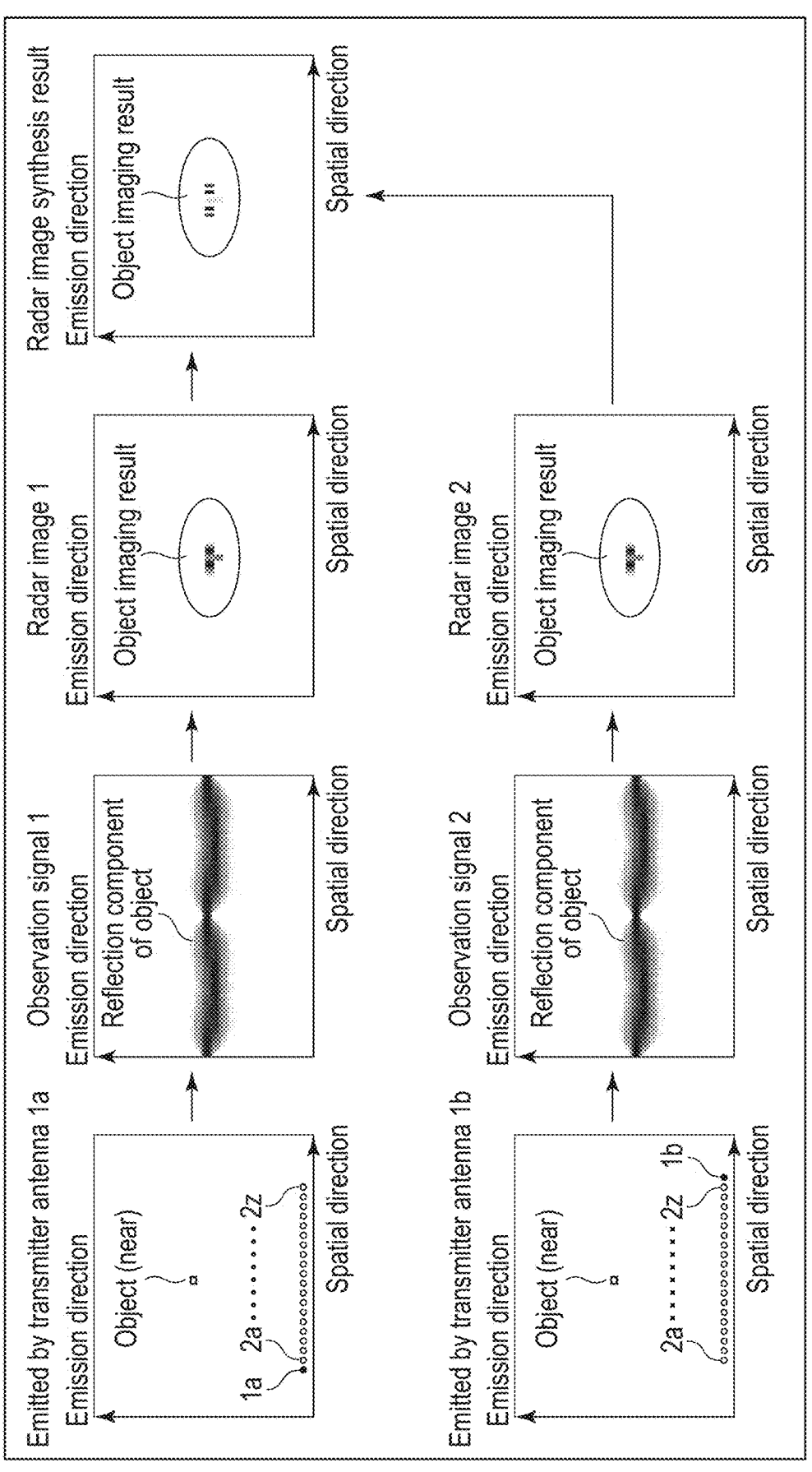
F I G. 14

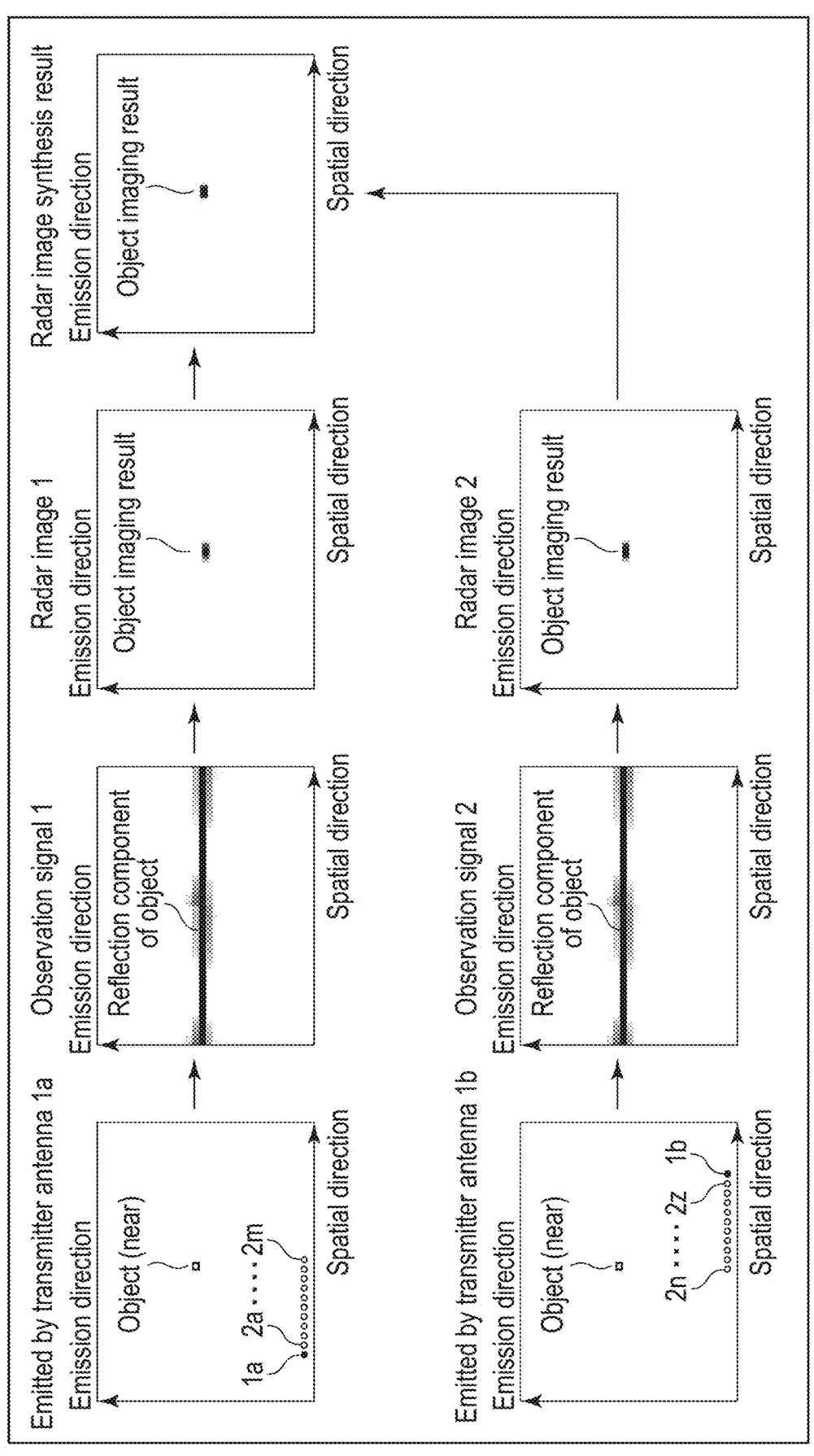
F I G. 15

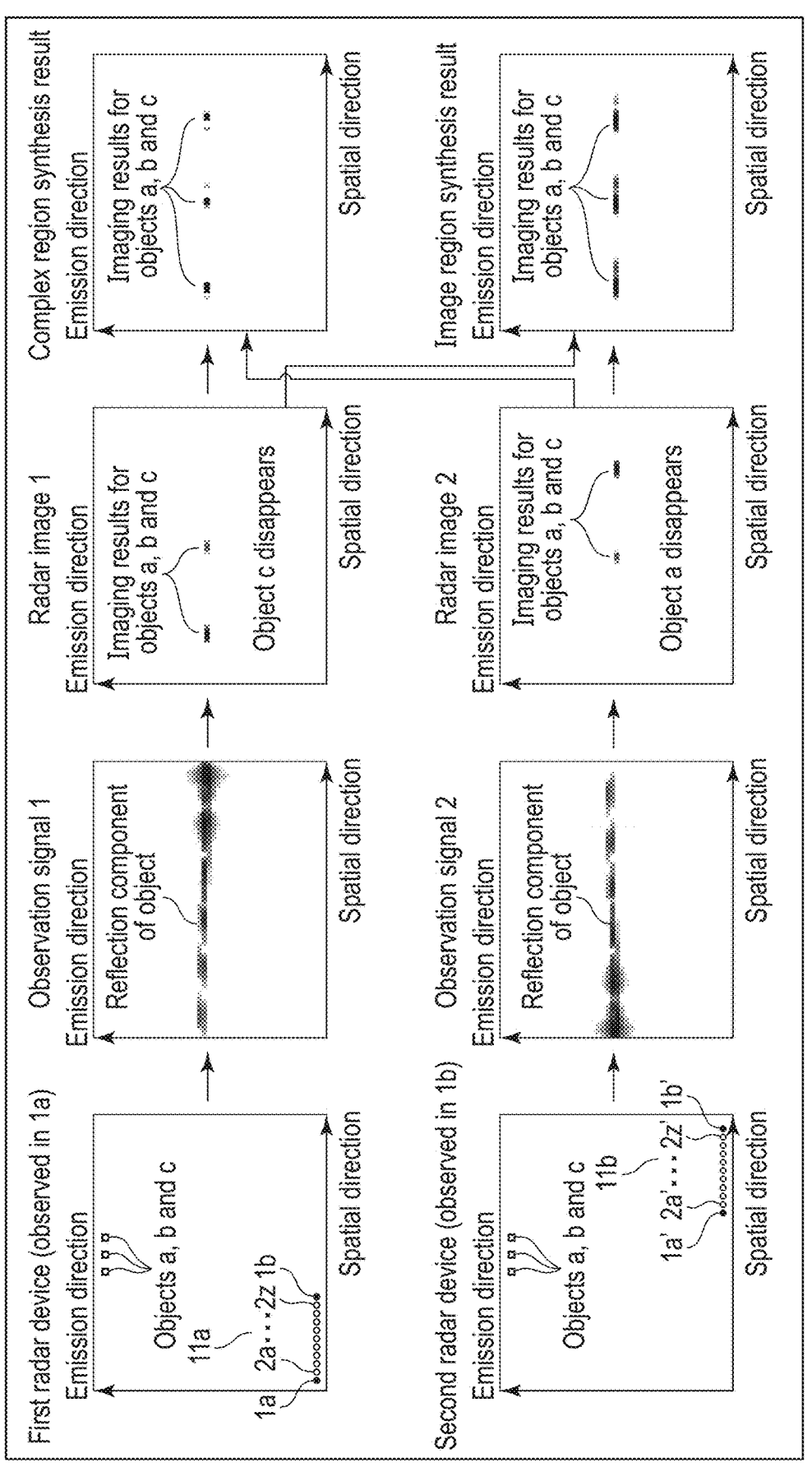
F I G. 17

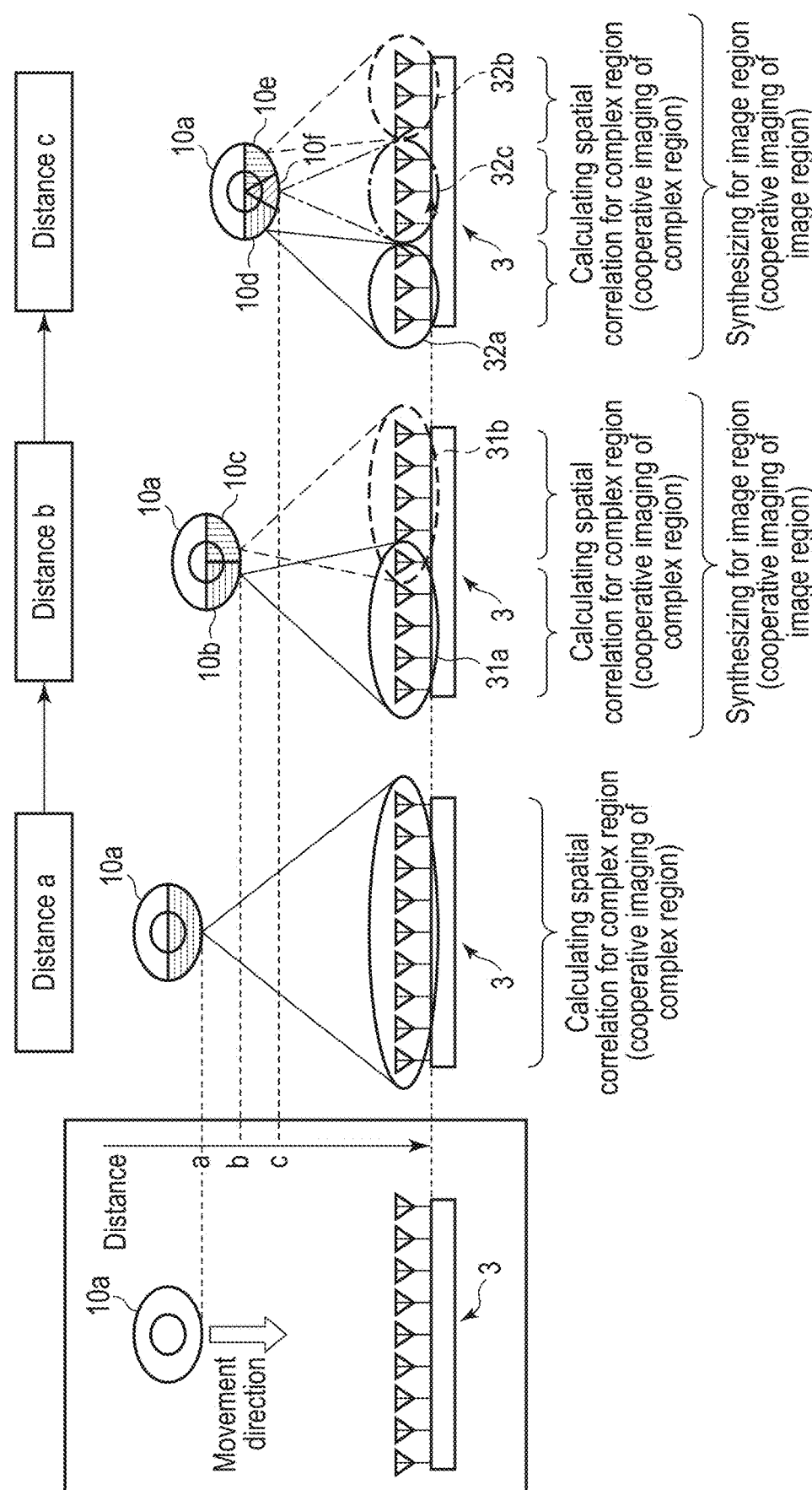
F I G. 18

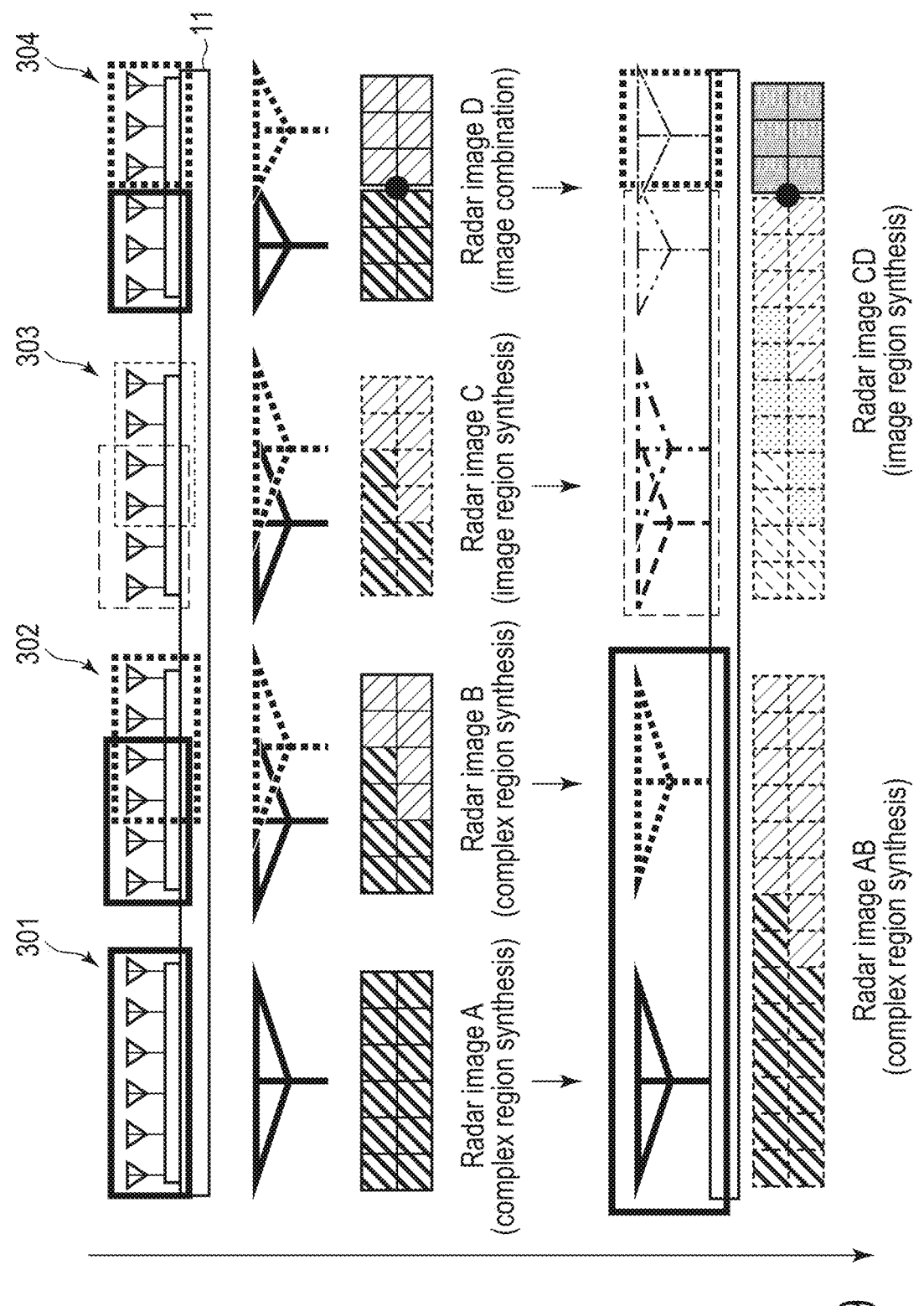
F I G. 19

RADAR SYSTEM

CROSS-REFERENCE TO RELATED APPLICATIONS

This application is based upon and claims the benefit of priority from Japanese Patent Application No. 2023-000237, filed Jan. 4, 2023, the entire contents of which are incorporated herein by reference.

FIELD

Embodiments described herein relate generally to a radar system.

BACKGROUND

In recent years, a radar system that images an object by using a reflected wave of a radar signal (transmission wave) has been developed.

Here, spatial resolution in the above-described imaging is generally set according to a range (a distance to an object) in which it is estimated that the object is present.

However, for example, in a case where the radar system is operated in an environment where the distance to the object changes (is indefinite), the spatial resolution achieved in the imaging changes, and there is a possibility that appropriate imaging of the object cannot be performed.

BRIEF DESCRIPTION OF THE DRAWINGS

FIG. 3 is a diagram for explaining spatial resolution.

FIG. 4 is a diagram for explaining the spatial resolution implemented by a single antenna.

FIG. 5 is a diagram for explaining the spatial resolution implemented by a plurality of antennas.

FIG. 6 is a diagram for explaining an application example of a radar system assumed in an embodiment.

FIG. 9 is a diagram for explaining an outline of an operation of the radar system according to the present embodiment.

FIG. 10 is a diagram illustrating an example of a configuration of the radar system.

FIG. 11 is a flowchart illustrating an example of a processing procedure of the radar system.

FIG. 13 is a diagram for explaining the comparative example of the present embodiment.

FIG. 14 is a diagram for explaining the comparative example of the present embodiment.

FIG. 15 is a diagram for explaining a radar image obtained in the present embodiment.

FIG. 17 is a diagram illustrating an example of a result of complex region synthesis and a result of image region synthesis.

FIG. 18 is a diagram for explaining an example of a radar image synthesis method applied in the present embodiment.

FIG. 19 is a diagram illustrating an example of radar image synthesis in which the complex region synthesis, the image region synthesis, and image combination are combined.

DETAILED DESCRIPTION

In general, according to one embodiment, a radar system includes a plurality of antennas configured to transmit radar signals and receive radar echoes based on reflected waves of the radar signals, and a processor configured to drive the antennas in first and second modes according to an object. In a case of driving the antennas in the first mode, the processor is configured to cause the antennas to be cooperatively operated, and image the object based on the radar echoes received by the antennas. In a case of driving the antennas in the second mode, the processor is configured to cause a first antenna group among the antennas to be cooperatively operated as a first group, image the object based on radar echoes received in the first antenna group, cause a second antenna group among the antennas to be cooperatively operated as a second group, and image the object based on radar echoes received in the second antenna group. The second antenna group is at least partially different from the first antenna group.

Various embodiments will be described with reference to the accompanying drawings.

A radar system according to the present embodiment is configured to measure an azimuth in which an object is positioned and a distance to the object by using a reflected wave, from the object, of a radar signal transmitted (emitted) to the object, and image the object (generate an image). Note that the radar signal transmitted to the object in such a radar system is, for example, a radio wave such as a millimeter wave (extra high frequency (EHF)).

Hereinafter, an outline of the radar system will be briefly described. First, a frequency modulated continuous wave (FMCW) method will be described as an example of a radar modulation method for performing frequency modulation.

Figure 1:
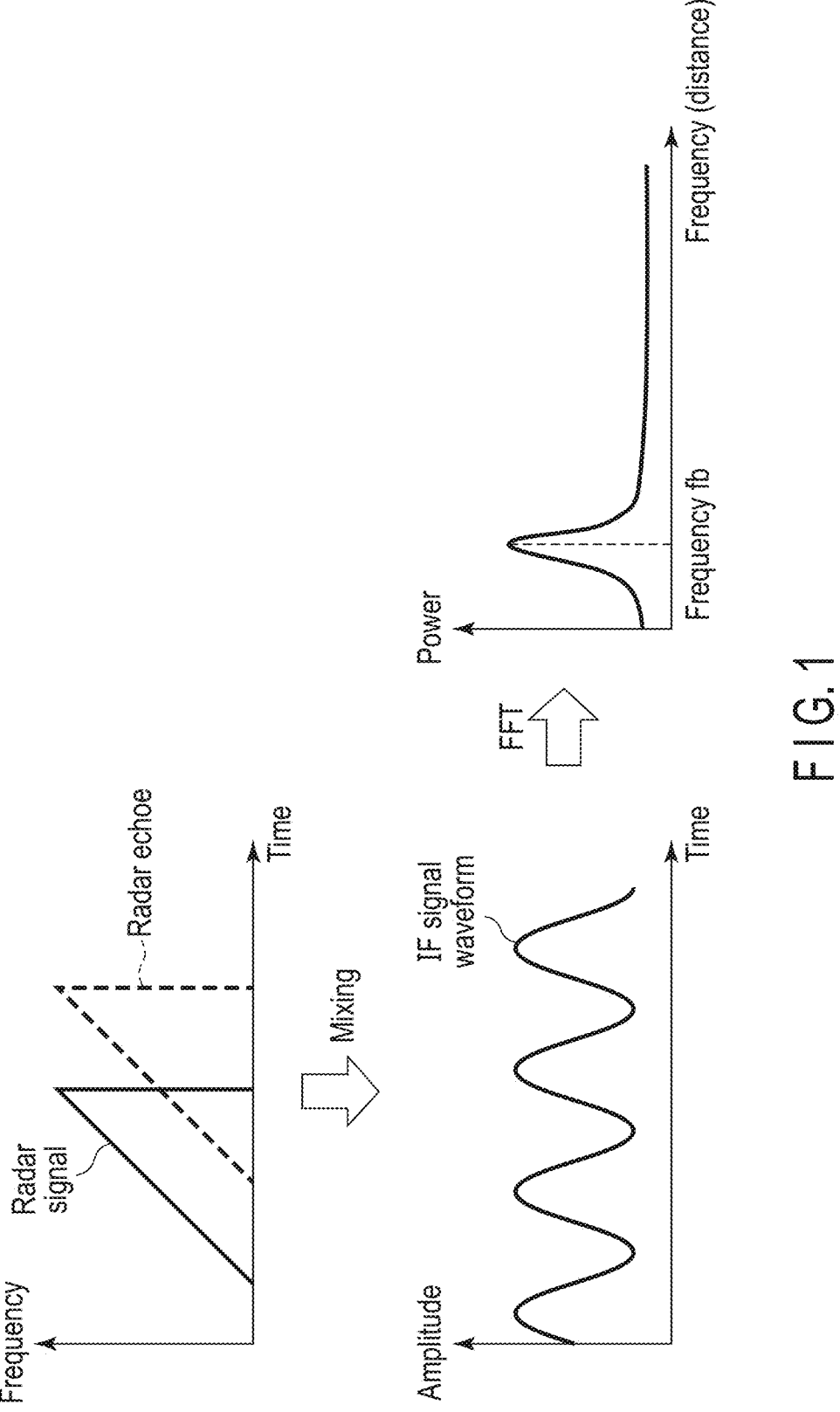
FIG. 1 is a diagram for explaining an outline of a frequency modulated continuous wave (FMCW) system adopted in a radar device.

According to the FMCW method, as illustrated in FIG. 1, a radar signal (transmitted wave) modulated in such a way that a frequency changes with the lapse of time is transmitted, and a distance to an object is measured based on a frequency difference (hereinafter, referred to as a beat frequency) between the radar signal and a radar echo (reflected wave signal) based on a reflected wave of the radar signal.

Specifically, in the FMCW method, an intermediate frequency (IF) signal (hereinafter, referred to as an IF signal) is acquired by mixing the radar signal and the radar echo. The IF signal corresponds to a time waveform (sine wave) of the beat frequency described above. $f_b$, $\gamma$, and $\tau$ have a relationship of $f_b = \gamma\tau$, in which $f_b$ represents the beat frequency, $\gamma$ is an inclination (frequency change rate) (Hz/s) of the radar signal called a chirp rate, and $\tau$ represents a round trip time with respect to the radar signal.

When, for example, fast Fourier transform (FFT) is applied to the IF signal, the IF signal is converted into frequency domain representation. In the FFT result, a peak appears at a position of the beat frequency $f_b$, and a distance (that is, the distance to the object reflecting the radar signal) corresponding to a position of the peak can be obtained.

The FMCW method that linearly performs frequency modulation as illustrated in FIG. 1 is particularly referred to as linear-FMCW.

Here, the radar system includes a radar device including a transmitter antenna (transmission antenna) and a receiver antenna (reception antenna), and a multiple-input multiple-output (MIMO) radar can be used as the radar device. The MIMO radar includes a plurality of transmitter antennas (transmitter antenna array) and a plurality of receiver antennas (receiver antenna array), and each of the transmitter antennas transmits a radar signal in a time division manner, and a radar echo based on a reflected wave of the radar signal is received by the plurality of receiver antennas, so that it is possible to implement a large number of times of reception of the radar echo (that is, radar observation) with a small number of times of transmission of the radar signal (that is, the number of times of radar emission).

Figure 2:
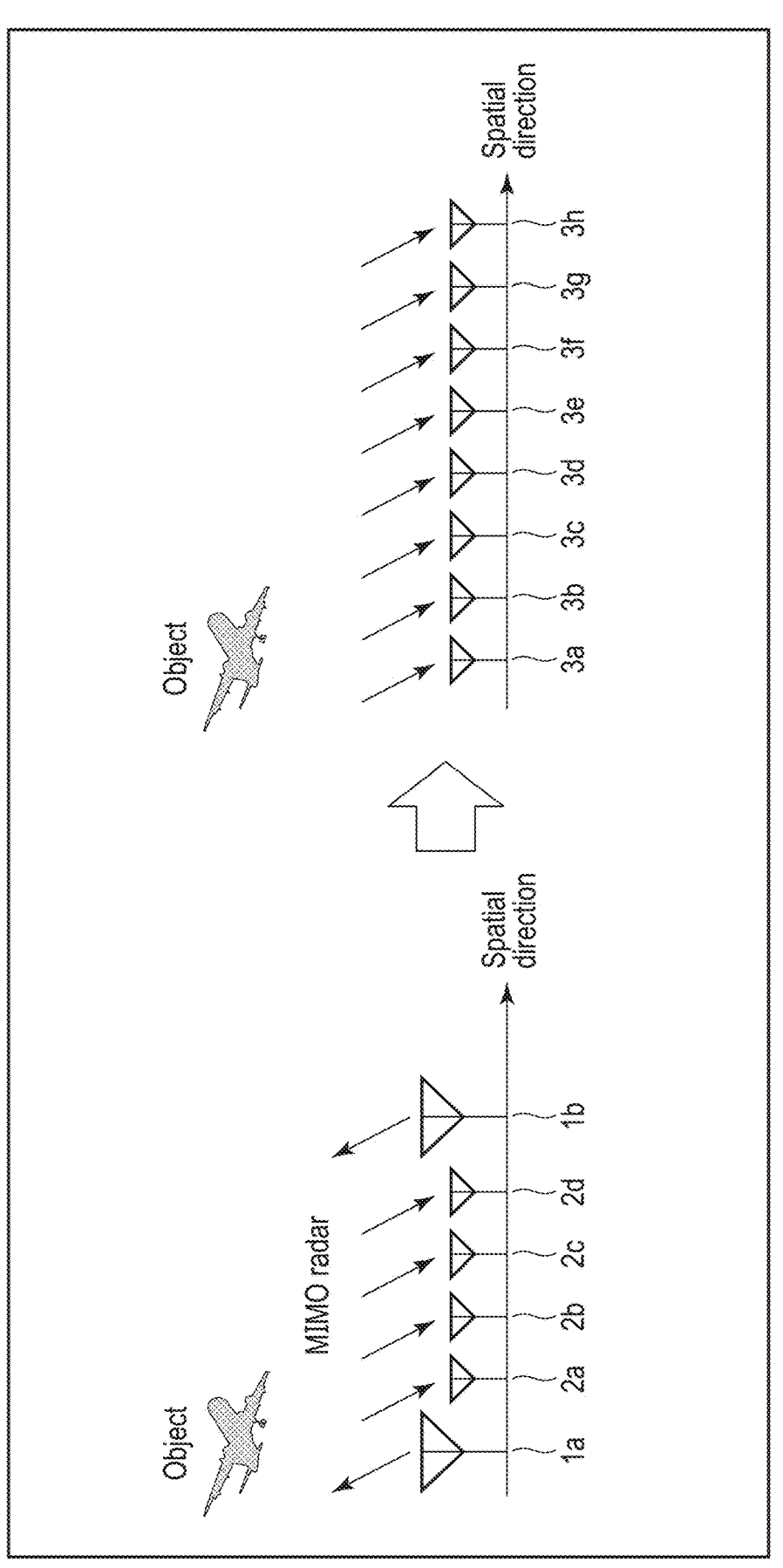
FIG. 2 is a diagram for explaining an outline of a multi-input multi-output (MIMO) radar.

Specifically, as illustrated in FIG. 2, it is assumed that the MIMO radar includes, for example, two transmitter antennas $1a$ and $1b$ and four receiver antennas $2a$ to $2d$ linearly arranged in a predetermined spatial direction.

In this case, for example, assuming that a radar signal is transmitted from the transmitter antenna $1a$, a radar echo based on a reflected wave of the radar signal is received by the receiver antenna $2a$. Although the receiver antenna $2a$ has been described here, the radar echo based on the reflected wave of the radar signal transmitted from the transmitter antenna $1a$ is similarly received by the receiver antennas $2b$ to $2d$.

Similarly, for example, assuming that a radar signal is transmitted from the transmitter antenna $1b$, a radar echo based on a reflected wave of the radar signal is received by the receiver antenna $2a$. Although the receiver antenna $2a$ has been described here, the radar echo based on the reflected wave of the radar signal transmitted from the transmitter antenna $1b$ is similarly received by the receiver antennas $2b$ to $2d$.

That is, in the MIMO radar described above, radar observation is performed in each of the receiver antennas $2a$ to $2d$ when a radar signal is transmitted from the transmitter antenna $1a$, and radar observation is similarly performed in the receiver antennas $2a$ to $2d$ when a radar signal is transmitted from the transmitter antenna $1b$.

With this configuration, the MIMO radar including the two transmitter antennas $1a$ and $1b$ and the four receiver antennas $2a$ to $2d$ as illustrated in FIG. 2 can implement eight observation points $3a$ to $3h$ arranged in the spatial direction only by emitting the radar signal from each of the transmitter antennas $1a$ and $1b$ once. For example, the observation point $3a$ is an observation point implemented by the receiver antenna $2a$ receiving a radar echo based on a reflected wave of the radar signal transmitted from the transmitter antenna $1a$. Similarly, the observation points $3b$ to $3d$ are observation points implemented by the receiver antennas $2b$ to $2d$ receiving radar echoes based on reflected waves of the radar signals transmitted from the transmitter antenna $1a$. Furthermore, the observation point $3e$ is an observation point implemented by the receiver antenna $2a$ receiving a radar echo based on a reflected wave of the radar signal transmitted from the transmitter antenna $1b$. Similarly, the observation points $3f$ to $3h$ are observation points implemented by the receiver antennas $2b$ to $2d$ receiving radar echoes based on reflected waves of the radar signals transmitted from the transmitter antenna $1b$. That is, in the MIMO radar, one observation point is implemented by a combination of one transmitter antenna and one receiver antenna.

With such a MIMO radar, it is possible to measure a distance to an object by using an IF signal (an IF signal acquired based on radar signals transmitted from the transmitter antennas $1a$ and $1b$ in a time division manner and a radar echo received by each of the receiver antennas $2a$ to $2d$) observed at each of the observation points $3a$ to $3h$.

By the way, in a case where the above-described MIMO radar is used to image an object in the radar system according to the present embodiment, a time difference occurs in a radar echo observed at each observation point, and thus, it is possible to improve spatial resolution in imaging of the object by calculating a correlation of the radar echo by radar signal processing, for example.

Hereinafter, the spatial resolution in imaging of an object will be described. In the MIMO radar described above, a plurality of observation points can be implemented by combining each of a plurality of transmitter antennas and each of a plurality of receiver antennas, and each of the plurality of observation points can be regarded as one antenna (transmitter/receiver antenna) that transmits a radar signal in the radar system and receives a radar echo based on a reflected wave of the radar signal. Therefore, in the following description, each of the plurality of observation points implemented in the MIMO radar may be simply referred to as an antenna.

Azimuth resolution of the radar is defined by angular resolution determined by a beam width of a radio wave transmitted (emitted) from the transmitter antenna. Here, as illustrated in FIG. 3, the beam width is a width (half width) at which power of the antenna gain is ½ of a peak value in the radar system. In addition, the angular resolution is resolution with which two or more objects (targets) can be separately detected by the beam width in an azimuth direction.

Note that the angular resolution achieved in the radar system depends on an antenna aperture length. Specifically, as the antenna aperture length increases, the beam width decreases (becomes a thin beam), and the azimuth resolution is improved. Here, the antenna aperture length corresponds to the size of an aperture surface of the antenna.

FIG. 4 illustrates the angular resolution implemented by a single antenna (observation point). In a case of a single antenna, the aperture length of an operable antenna is limited, and imaging cannot be performed with high azimuth resolution.

On the other hand, FIG. 5 illustrates the angular resolution implemented by a plurality of antennas. The plurality of antennas means that there are a plurality of observation points described above in a case of the MIMO radar, for example. In this case, a radar signal and a radar echo are transmitted and received at different spatial coordinates, and a correlation between a spatial filter and each radar echo (observation signal) is calculated by signal processing, whereby the aperture length of the antenna virtually increases, and thus, the azimuth resolution can be improved.

As illustrated in FIG. 3, it is assumed that spatial resolution d in the present embodiment is obtained by converting angular resolution $\theta$ into a distance (m), and the spatial resolution d changes depending on not only the antenna aperture length but also a distance to an object that reflects a radar signal in a direction in which the radar signal is emitted. For example, the spatial resolution d deteriorates as the distance to the object increases, and is improved as the distance to the object decreases.

By the way, in a radar system that performs imaging of an object, generally, an antenna aperture length necessary for achieving a desired spatial resolution and a range (an angle of view) in which imaging is performed are determined after setting a distance to an object. Therefore, in a case where the distance between the antenna and the object in the radar system is constant, a desired spatial resolution can be achieved in imaging of the object.

However, in a radar system operated in an environment in which a distance to an object (a distance between the object and the antenna) dynamically changes every time imaging is performed, a range in which a radar echo from the object can be received changes, leading to a change in spatial resolution to be achieved, excessive calculation processing, deterioration of imaging, and the like.

Here, an application example of the radar system assumed in the present embodiment will be briefly described with reference to FIG. 6. In the present embodiment, a radar system 10 can be applied to a security inspection system installed in a facility such as an airport, a station, a shopping mall, a concert hall, or an exhibition hall.

As illustrated in FIG. 6, a plurality of radar modules 3 corresponding to the above-described MIMO radar including a plurality of transmitter antennas 1 and a plurality of receiver antennas 2 are mounted on the radar system 10. In each of the plurality of radar modules 3, for example, the plurality of transmitter antennas 1 and the plurality of receiver antennas 2 are arranged at corresponding positions (parallel movement or rotation). Alternatively, for example, the arrangement of the plurality of transmitter antennas 1 and the plurality of receiver antennas 2 of one radar module 3 corresponds to a case where the plurality of transmitter antennas 1 and the plurality of receiver antennas 2 of another radar module 3 are line-symmetrically or point-symmetrically arranged.

The radar system 10 images an object by receiving a radar echo based on a reflected wave of a radar signal transmitted from each of the plurality of transmitter antennas 1 included in each radar module 3 by the plurality of receiver antennas 2. In a case where the radar system 10 is applied to a security inspection system in the present embodiment, an object to be imaged in the radar system 10 is, for example, a person who uses a facility or an article (carried article) possessed by the person.

A result of imaging the person or the article possessed by the person by such a radar system 10 can be used to determine whether or not the person possesses a dangerous article.

Note that the object to be imaged in the radar system 10 applied to the security inspection system may be, for example, a load carried on a conveyor belt installed in the facility.

When performing imaging of an object in such a radar system 10, there is a possibility that appropriate imaging of the object cannot be performed (that is, set spatial resolution cannot be achieved) due to a dynamic change in distance between the object and the radar module 3 (a distance to the object).

Here, a relationship between a distance to an object and the spatial resolution will be described with reference to FIGS. 7 and 8. Here, it is assumed that the object is a person.

Figure 7:
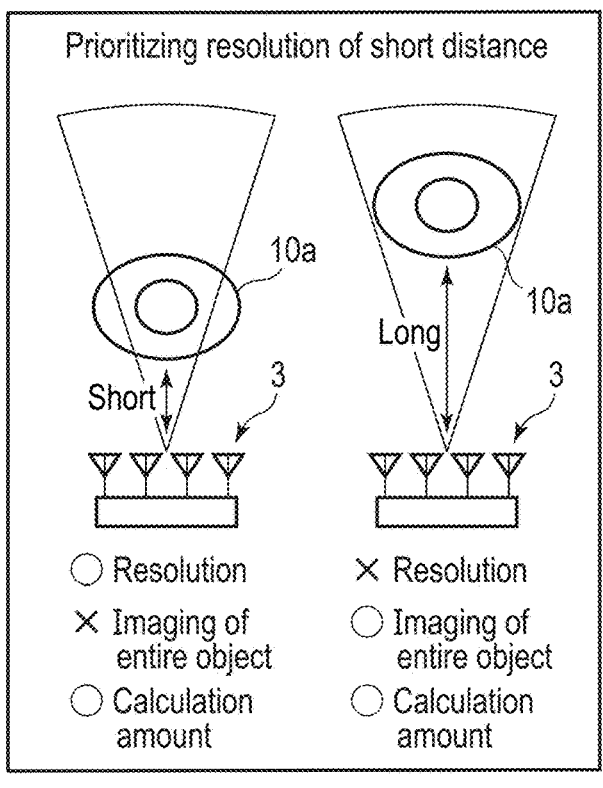
FIG. 7 is a diagram for explaining a relationship between a distance to an object and the spatial resolution.

FIG. 7 assumes a case where the radar system 10 (radar module 3) is designed to achieve a desired spatial resolution with respect to an object 10a present at a short distance by decreasing the antenna aperture length (for example, reducing the number of observation points implemented in the MIMO radar). In such a radar system 10, in a case where the object 10a is present at a short distance from the radar module 3 as illustrated on the left side of FIG. 7, a desired spatial resolution can be achieved, but there is a possibility that imaging (imaging) of the entire object 10a cannot be performed. On the other hand, in a case where the object 10a is present at a long distance from the radar module 3 as illustrated on the right side of FIG. 7, imaging of the entire object 10a can be performed, but a desired spatial resolution cannot be achieved.

Figure 8:
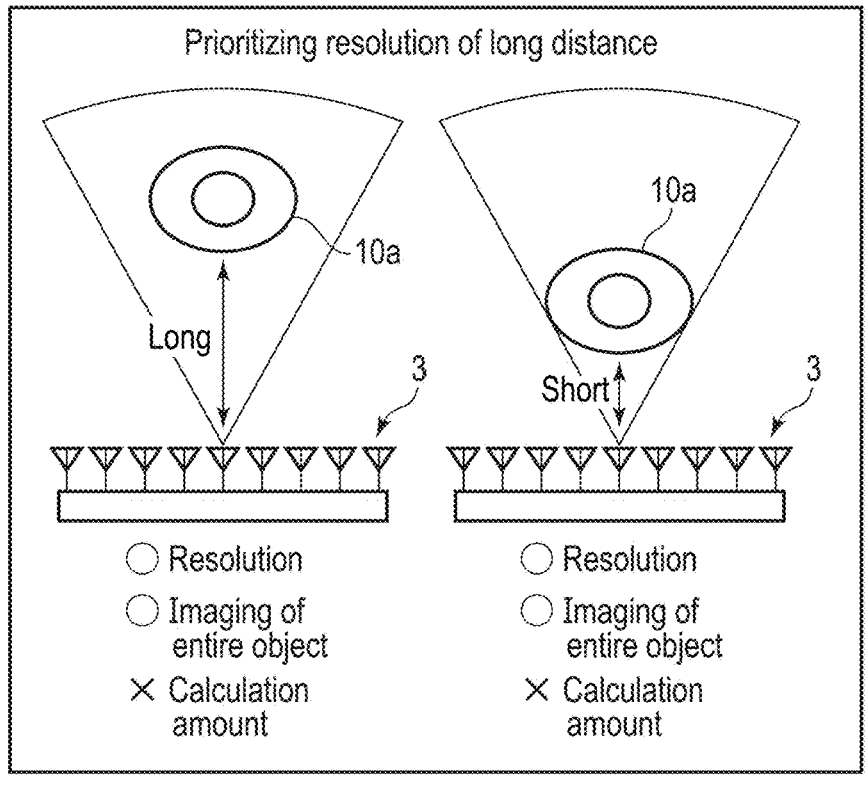
FIG. 8 is a diagram for explaining the relationship between the distance to the object and the spatial resolution.

FIG. 8 assumes a case where the radar system 10 (radar module 3) is designed to achieve a desired spatial resolution with respect to the object 10a present at a long distance by increasing the antenna aperture length (for example, increasing the number of observation points implemented in the MIMO radar). In such a radar system 10, in a case where the object 10a is present at a long distance from the radar module 3 as illustrated on the left side of FIG. 8, a desired spatial resolution can be achieved, and imaging of the entire object 10a can be performed. On the other hand, in a case where the object 10a is present at a short distance from the radar module 3 as illustrated on the right side of FIG. 8, although the spatial resolution is excessive, a desired spatial resolution can be achieved, and imaging of the entire object 10a can be performed.

Referring to FIGS. 7 and 8 described above, from the viewpoint of achieving a desired spatial resolution and imaging the entire object 10a, it is considered preferable to design the radar system 10 in such a way as to achieve a desired spatial resolution for the object 10a present at a long distance (that is, the antenna aperture length is increased). However, in a case where the antenna aperture length is increased, it is necessary to execute radar signal processing on observation signals (radar echoes) observed at more observation points implemented in the MIMO radar, for example, as compared with a case where the antenna aperture length is small. Therefore, a processing amount (calculation amount) increases. In a case where the antenna aperture length is large, there is a possibility that an observation signal that does not contribute to imaging of the object 10a due to the distance to the object 10a may be observed, which may result in excessive calculation processing and deterioration of imaging.

Therefore, the present embodiment provides the radar system 10 having a configuration capable of performing appropriate imaging even in an environment where a distance to an object dynamically changes.

Hereinafter, an outline of an operation of the radar system 10 according to the present embodiment will be described with reference to FIG. 9. In FIG. 9, a case where the object 10a (for example, a person) moves toward the radar module 3 is assumed.

First, it is assumed that the object 10a is present at a position at a distance a from the radar module 3. In this case, since a radar echo based on a reflected wave of a radar signal from the object 10a can be received by all of the plurality of antennas, the radar system 10 can achieve a desired spatial resolution by imaging the object 10a by causing all of the plurality of antennas to be cooperatively operated.

Next, it is assumed that the object 10a is present at a position at a distance b from the radar module 3. Here, assuming that the shape of the object 10a viewed in a direction perpendicular to a floor surface of a facility where the object 10a moves is a substantially cylindrical shape, a radar echo based on a reflected wave from a right side portion 10b of the object 10a in a movement direction is received by an antenna group belonging to a first group 31a among the plurality of antennas, and is not received by antennas other than the antenna group belonging to the first group 31a. Further, a radar echo based on a reflected wave from a left side portion 10c of the object 10a in the movement direction is received by an antenna group belonging to a second group 31b among the plurality of antennas, and is not received by antennas other than the antenna group belonging to the second group 31b. That is, in a case where the object 10a is present at the position at the distance b from the radar module 3, even when all of the plurality of antennas included in the radar module 3 are cooperatively operated, the spatial resolution achieved in the radar system 10 is limited to a range in which the radar echo can be received by each of the first and second groups 31a and 31b (that is, a range in which reflection can be detected), which may result in excessive calculation processing and deterioration of imaging.

Furthermore, it is assumed that the object 10a is present at a position at a distance c from the radar module 3. In this case, a radar echo based on a reflected wave from a right side portion 10d of the object 10a in the movement direction is received by an antenna belonging to a first group 32a among the plurality of antennas, and is not received by an antenna other than the antenna belonging to the first group 32a. Further, a radar echo based on a reflected wave from a left side portion 10e of the object 10a in the movement direction is received by an antenna group belonging to a second group 32b among the plurality of antennas, and is not received by antennas other than the antenna group belonging to the second group 32b. Further, a radar echo based on a reflected wave from a portion 10f corresponding to the movement direction of the object 10a (that is, a portion other than the right side portion 10d and the left side portion 10e) is received by an antenna group belonging to a third group 32c among the plurality of antennas, and is not received by antennas other than the antenna group belonging to the third group 32c. That is, in a case where the object 10a is present at the position at the distance c from the radar module 3, even when all of the plurality of antennas included in the radar module 3 are cooperatively operated, the spatial resolution achieved in the radar system 10 is limited to a range in which the radar echo can be received by each of the first to third groups 32a to 32c (that is, a range in which reflection can be detected), which may result in excessive calculation processing and imaging degradation.

Here, a case where the shape of the object is a substantially cylindrical shape has been described, but if the shape of the object is, for example, a planar shape, the range in which the radar echo can be received is considered to be different.

Therefore, in order to avoid excessive calculation processing and deterioration of imaging, the radar system 10 according to the present embodiment is operated to group the plurality of antennas included in the radar module 3 and cause the plurality of antennas to be cooperatively operated according to a distance to an object (the position of the object) or/and the shape or the like of the object (that is, the object).

FIG. 10 illustrates an example of a configuration of the radar system 10 according to the present embodiment. As illustrated in FIG. 10, the radar system 10 includes a radar device 11, a sensor 12, and a processor 13.

The radar device 11 includes a plurality of antennas configured to transmit radar signals and receive radar echoes based on reflected waves of the radar signals. In a case where the radar device 11 is, for example, the above-described MIMO radar, the plurality of antennas included in the radar device 11 may be the plurality of observation points implemented by a combination of each of the plurality of transmitter antennas and each of the plurality of receiver antennas in the MIMO radar. Furthermore, for example, the plurality of radar modules including the plurality of antennas (antenna elements) as described above with reference to FIG. 6 may be mounted on the radar device 11, the radar device 11 may be configured to operate the plurality of radar modules 3 in synchronization. Furthermore, although only one radar device 11 is illustrated in FIG. 10, the radar device 11 may be implemented by a plurality of radar devices.

The sensor 12 is configured to measure (detect) a distance to an object and/or the shape of the object. The sensor 12 includes, for example, a distance measurement sensor, a camera, and the like.

The processor 13 drives the plurality of antennas included in the radar device 11 according to the object (the distance to the object or/and the shape of the object) described above, and performs imaging of the object. The processor 13 may be implemented by hardware such as an integrated circuit (IC), software (a processor such as a central processing unit (CPU) or a microcontroller executes a predetermined program), or a combination of hardware and software.

The processor 13 includes a mode determination module 131, a radar drive module 132, a grouping module 133, an imaging module 134, and a radar image output module 135.

The mode determination module 131 determines a mode for driving (the plurality of antennas included in) the radar device 11 based on a measurement result of the sensor 12 (that is, the object measured by the sensor 12).

The radar drive module 132 drives the radar device 11 in the mode determined by the mode determination module 131. In this case, the radar drive module 132 sets a group to which each of the plurality of antennas included in the radar device 11 belongs according to the mode determined by the mode determination module 131, and causes an antenna group belonging to the set group to be cooperatively operated. The radar drive module 132 acquires a plurality of radar echoes (observation signals) received by the plurality of antennas from the radar device 11 by driving the radar device 11 (the plurality of antennas).

The grouping module 133 groups the plurality of radar echoes acquired by the radar drive module 132 based on the group set by the radar drive module 132.

The imaging module 134 images the object based on the radar echoes grouped by the grouping module 133.

The radar image output module 135 outputs a result of the imaging performed by the imaging module 134 (that is, a radar image including the object).

Although the radar device 11 and the sensor 12 are illustrated separately in FIG. 10, the sensor 12 may be incorporated in the radar device 11.

Furthermore, in the radar system 10, the radar device 11, the sensor 12, and the processor 13 may be configured as one device. On the other hand, the radar device 11, the sensor 12, and the processor 13 may be configured as separate devices. In this case, the processor 13 (processing device) may be away from the radar device 11 and the sensor 12, and may be communicably connected to the radar device 11 and the sensor 12 via a network.

Hereinafter, an example of a processing procedure of the radar system 10 will be described with reference to a flowchart of FIG. 11.

In a case of imaging an object, the sensor 12 included in the radar system 10 measures, for example, a distance to the object (step S1). Here, the sensor 12 is configured integrally with the radar device 11, and the distance measured by the sensor 12 corresponds to a distance between the object and the plurality of antennas included in the radar device 11 (that is, a distance from the radar device 11 to the object). In addition, it is assumed that the shape of the object (that is, the object is, for example, a person) is grasped in advance.

When the processing of step S1 is executed, the processor 13 included in the radar system 10 acquires (data of) the distance measured in step S1 from the sensor 12. The mode determination module 131 included in the processor 13 determines a mode for driving the radar device 11 based on the distance acquired by the processor 13 (step S2).

Next, the radar drive module 132 sets a group to which each of the plurality of antennas included in the radar device 11 belongs according to the mode determined in step S2 (step S3).

When the processing of step S3 is executed, the radar drive module 132 drives the radar device 11 in such a way as to cause an antenna group belonging to the group set in step S3 to be cooperatively operated.

Hereinafter, the processing of steps S2 to S4 will be specifically described with reference to FIG. 9 described above.

First, it is assumed that the distance a measured in step S1 is the distance a illustrated in FIG. 9. In this case, in step S2, a first mode is determined as the mode for driving the radar device 11. Next, in step S3, all of the plurality of antennas are set as one group as illustrated in FIG. 9. In this case, in step S4, the radar device 11 is driven in such a way as to cause all of the plurality of antennas to be cooperatively operated.

Next, it is assumed that the distance measured in step S1 is the distance b illustrated in FIG. 9. In this case, in step S2, a second mode is determined as the mode for driving the radar device 11. Next, in step S3, the first and second groups 31a and 31b illustrated in FIG. 9 are set. The first antenna group of the plurality of antennas selected based on the distance to the object 10a or the like belongs to the first group 31a. The second antenna group of the plurality of antennas selected based on the distance to the object 10a or the like belongs to the second group 31b. In this case, in step S4, the radar device 11 is driven in such a way as to cause the first antenna group to be cooperatively operated as the first group 31a and cause the second antenna group to be cooperatively operated as the second group 31b.

Furthermore, it is assumed that the distance measured in step S1 is the distance c illustrated in FIG. 9. In this case, in step S2, a third mode is determined as the mode for driving the radar device 11. Next, in step S3, the first to third groups 32a to 32c illustrated in FIG. 9 are set. The first antenna group of the plurality of antennas selected based on the distance to the object 10a or the like belongs to the first group 32a. The second antenna group of the plurality of antennas selected based on the distance to the object 10a or the like belongs to the second group 32b. The third antenna group of the plurality of antennas selected based on the distance to the object 10a or the like belongs to the third group 32c. In this case, in step S4, the radar device 11 is driven in such a way as to cause the first antenna group to be cooperatively operated as the first group 32a, cause the second antenna group to be cooperatively operated as the second group 32b, and cause the third antenna group to be cooperatively operated as the third group 32c. The distance a is larger than the distance b, and the distance b is larger than the distance c. That is, the first mode is selected in a case where the distance to the object 10a is equal to or larger than a first predetermined value, the second mode is selected in a case where the distance to the object 10a is smaller than the first predetermined value and equal to or larger than a second predetermined value, and the third mode is selected in a case where the distance to the object 10a is equal to or smaller than the second predetermined value. The first predetermined value is a value larger than the second predetermined value, and the first predetermined value and the second predetermined value are determined based on the spatial resolution implemented in the radar system 10.

In a case where the second or third mode is determined in step S2 described above, the group is set in such a way that at least some of the antennas are different in step S3. In other words, like the groups 31a and 31b illustrated in FIG. 9, some antennas may overlap between (the antenna groups belonging to) the groups 31a and 31b. Further, like the groups 32a to 32c illustrated in FIG. 9, the antennas do not have to overlap between (the antenna groups belonging to) the groups 32a to 32c.

In addition, the plurality of groups (the antenna group belonging to each of the plurality of groups) set in a case where the second or third mode is determined are set based on, for example, a range in which a radar echo based on a reflected wave from the object can be received (a range in which reflection can be detected). In this case, since the range in which a radar echo based on a reflected wave from the object can be received is considered to be different according to the shape of the object, (the antenna group belonging to each of) the plurality of groups set in a case where the second or third mode is determined may be set based on the shape of the object. Here, it is described that the shape of the object is known (grasped in advance), but in a case where the shape of the object is not known, the plurality of groups may be set based on the shape of the object measured by the sensor 12.

For example, information (hereinafter, referred to as mode information) indicating a correspondence relationship between a measurement result of the sensor 12 (the distance to the object and/or the shape of the object) and the mode (for example, the first to third modes) determined based on the measurement result may be stored in advance in (a memory region allocated to) the mode determination module 131, for example. With such a configuration, the mode determination module 131 can determine the mode for driving the radar device 11 based on the measurement result obtained in step S1 and the mode information.

Furthermore, for example, information (hereinafter, referred to as group information) indicating a correspondence relationship between the determined mode and (the antenna group belonging to) the group set according to the mode may be stored in advance in (a memory region allocated to) the radar drive module 132, for example. With such a configuration, the radar drive module 132 can set the group based on the mode and the group information determined in step S2.

In a case where the radar device 11 is driven in step S4 as described above, the radar drive module 132 acquires a plurality of radar echoes (observation signals) received by the plurality of antennas included in the radar device 11 from the radar device 11. The grouping module 133 groups the plurality of radar echoes acquired by the radar drive module 132 based on the group set by the radar device 11 (step S5). Specifically, for each group set by the radar drive module 132, the grouping module 133 executes processing of grouping the radar echoes received by the antenna group belonging to the group.

When the processing in step S5 is executed, the imaging module 134 performs imaging (cooperative imaging) for each of the radar echoes (that is, the group set by the radar drive module 132) grouped in step S5 (step S6).

In step S6, radar signal processing for calculating a correlation between the grouped radar echoes and the spatial filter (a spatial correlation between the radar echoes) is executed. The radar signal processing includes signal processing based on a synthetic aperture radar (SAR). The SAR is a signal processing technology that implements high-resolution imaging virtually observed with a large-aperture antenna by performing observation multiple times while moving a low-resolution small-aperture antenna and synthesizing the observation results. In the SAR, high resolution can be implemented by synthesizing radar echoes with relative distances between the observation points and the target normalized.

Although the signal processing based on the SAR has been briefly described here, the radar signal processing may be signal processing based on beamforming for estimation of a direction of arrival, or the like.

When the above-described radar signal processing is executed, the imaging module 134 can generate a radar image (complex number) including the object.

When the processing of step S6 is executed, the radar image output module 135 outputs the radar image generated for each group by executing the processing of step S6 (step S7). In this case, the radar image output module 135 may output a result of further performing imaging (that is, synthesis) of the radar images generated for each group. The radar image output by the radar image output module 135 may be displayed on, for example, a display or the like included in the radar system 10, or may be transmitted to a server device or the like outside the radar system 10.

In a case where the radar system 10 according to the present embodiment is applied to the security inspection system described above, the radar image output from the radar system 10 can be used, for example, to determine whether or not a person (target person) to be inspected is hiding a dangerous article. Here, the dangerous article is an example of the object described above, and includes, for example, an object that is not permitted to be possessed in a facility (area) in which the radar system 10 (security inspection system) is installed. Specific examples of the dangerous article include a metal such as a handgun or a knife, and a powder such as an explosive. In addition, the dangerous article may be a powder such as narcotics or an illegal article such as a bar.

Whether or not the person is hiding a dangerous article may be determined by an operator who refers to the radar image, or may be automatically determined by performing image analysis on the radar image. In a case where it is automatically determined whether or not the person is hiding a dangerous article, the determination processing may be executed, for example, in the radar system 10, or may be executed by a server device or the like outside the radar system 10.

Furthermore, the radar image output from the radar system 10 (radar image output module 135) may be an image reflecting the determination result as to whether or not the person is hiding a dangerous article (for example, an image in which the dangerous article is highlighted) as described above.

The processing of FIG. 11 described above is executed every time the object moves. With this configuration, it is possible to implement a configuration in which, for example, the first to third modes are switched according to the distance to the object.

As described above, the radar system 10 according to the present embodiment includes the plurality of antennas configured to transmit radar signals and receive radar echoes based on reflected waves of the radar signals, and the processor 13 configured to drive (the radar device 11 including) the plurality of antennas in the first and second modes according to an object (for example, a distance to the object).

In the present embodiment, in a case of driving the plurality of antennas in the first mode, the processor 13 causes the antennas to be cooperatively operated, and performs imaging (cooperative imaging) of the object based on radar echoes received by the plurality of antennas.

Furthermore, in the present embodiment, in a case of driving the plurality of antennas in the second mode, the processor 13 causes the first antenna group among the plurality of antennas to be cooperatively operated as the first group, and performs imaging (cooperative imaging) of the object based on radar echoes received in the first antenna group. Furthermore, the processor 13 causes the second antenna group among the plurality of antennas to be cooperatively operated as the second group, and performs imaging (cooperative imaging) of the object based on radar echoes received in the second antenna group. The second antenna group is at least partially different from the first antenna group.

Although it has been described here that the plurality of antennas are driven in the first and second modes according to the object, in a case where a distance between an object and (the radar device 11 including) the plurality of antennas is smaller than a predetermined value, the processor 13 according to the present embodiment may cause the first antenna group among the plurality of antennas to be cooperatively operated as the first group, image the object based on radar echoes received in the first antenna group, cause the second antenna group among the plurality of antennas to be cooperatively operated as the second group, and images the object based on radar echoes received in the second antenna group.

In the present embodiment, with the above-described configuration, a desired spatial resolution can be achieved even in an environment where a distance to an object dynamically changes, and appropriate imaging of an object can be performed.

Here, for example, it is assumed that the radar device 11 is designed in such a way that, in a case where an object is present at a position 2 m away from the radar module (the plurality of antennas), spatial resolution of 4 mm can be achieved by driving the radar device 11 in the above-described first mode (that is, all of the plurality of antennas are caused to be cooperatively operated).

In this case, if the object moves to a position 1 m away from the radar module, for example, the antenna group belonging to the first group 31a illustrated in FIG. 9 is caused to be cooperatively operated, and the antenna group belonging to the second group 31b is caused to be cooperatively operated by driving the radar device 11 in the above-described second mode. With this configuration, although the number of antennas to be cooperatively operated (antenna aperture length) is substantially halved, the distance to the object is also halved, and as a result, the spatial resolution of 4 mm can be achieved in imaging performed for each group.

Furthermore, if the object moves to a position 0.66 m away from the plurality of antennas, for example, the antenna group belonging to the first group 32a illustrated in FIG. 9 is caused to be cooperatively operated, the antenna group belonging to the second group 32b is caused to be cooperatively operated, and the antenna group belonging to the third group 32c is caused to be cooperatively operated by driving the radar device 11 in the above-described third mode. With this configuration, although the number of antennas to be operated in cooperation (antenna aperture length) is ⅓, the distance to the object is also approximately ⅓, and as a result, the spatial resolution of 4 mm can be achieved in imaging performed for each group.

That is, in the present embodiment, for example, a predetermined spatial resolution can be achieved by dynamically selecting an antenna group for performing cooperative imaging according to a distance to an object (that is, the position of the object).

Furthermore, in the present embodiment, a plurality of antennas are grouped in such a way that a radar echo that does not contribute to imaging of an object is not received (that is, a radar echo based on a reflected wave from the object can be received), and it is thus possible to avoid excessive calculation processing and deterioration of imaging.

In the present embodiment, a plurality of antennas are driven in the first and second modes according to an object. However, the mode for driving the plurality of antennas in the present embodiment may be determined according to the distance to the object (the position of the object) or may be determined according to the shape of the object (the type of the object). Furthermore, the mode for driving the plurality of antennas may be determined according to both the distance to the object and the shape of the object. That is, in the present embodiment, for example, the first and second modes (or the first to third modes) can be switched according to at least one of the distance to the object (the distance between the object and the plurality of antennas) or the shape of the object. It is assumed that the distance to the object and the shape of the object are measured by the sensor 12 (the distance measurement sensor, camera, or the like).

Furthermore, the mode for driving the plurality of antennas in the present embodiment may be determined according to spatial resolution (that is, spatial resolution for an object) specified for imaging of the object. In this case, it is sufficient if grouping is performed on a plurality of antennas in such a way that the specified spatial resolution can be achieved. The specified spatial resolution may be a single value or may be one of a range of several stages.

Furthermore, in the present embodiment, the radar device 11 may have a configuration in which a plurality of radar modules are mounted, some of the plurality of antennas are included in a first radar module, and the other some of the plurality of antennas are included in a second radar module disposed while being spaced apart from the first radar module. In this case, for example, an antenna group included in the first radar module may be set as the first group, and an antenna group included in the second radar module may be set as the second group. The radar device 11 may also have a configuration in which only a single radar module is mounted.

Furthermore, the radar device 11 may be implemented by a plurality of radar devices (for example, the first and second radar devices). In this case, for example, the plurality of antennas (antenna group) included in the first radar device may be set as the first group, and the plurality of antennas (antenna group) included in the second radar device may be set as the second group.

Furthermore, it is sufficient if the radar system 10 according to the present embodiment is configured to drive the radar device 11 (the plurality of antennas) in at least the first and second modes according to an object, but the radar system 10 may be configured to drive the radar device 11 in the first to third modes as described in FIG. 9, or may be configured to drive the radar device 11 in four or more modes, for example.

As described above, in the present embodiment, imaging (that is, synthesis of radar images) may be further performed on the radar images generated for each group. Such an imaging method (synthesis method) includes complex region synthesis (cooperative imaging of a complex region), image region synthesis (cooperative imaging of an image region), and image combination.

The complex region synthesis is an imaging method in which a plurality of radar images (complex numbers) are input and a complex region synthesis result is output. With the complex region synthesis, higher resolution of the radar image can be expected.

The image region synthesis is an imaging method in which a plurality of radar images (complex numbers) are input, each absolute value (amplitude) is calculated, and then an amplitude region synthesis result is output. In the image region synthesis, since the complex numbers are not synthesized with each other, for example, even in a case where the distance to the object is short (the object is close), deterioration of imaging does not occur, and a signal-to-noise (SN) ratio of the image is increased (that is, noise can be suppressed). In addition, the image region synthesis can reduce the calculation amount as compared with the complex region synthesis.

Image combination is an imaging method in which a plurality of radar images (complex numbers) are input, each absolute value (amplitude) is calculated, and then, images are combined in such a way as to be spatially continuous.

Here, in order to reduce a calculation amount of a back-projection (BP) method which is radar signal processing for high resolution, a configuration in which only a signal (contribution data) greatly contributing to imaging of an object when a plurality of observation signals (radar echoes) are received is extracted, and convolution processing of the contribution data and reference data (matched filter) is executed to generate a radar image (a radar image of the object) (hereinafter, described as a comparative example of the present embodiment) is considered.

In the comparative example of the present embodiment, only an antenna important for imaging of the object is dynamically selected from all the observation signals, and a spatial correlation for a complex region is calculated. Therefore, it is considered that the imaging of the object can be performed while reducing the calculation amount even in a case where the distance to the object varies.

However, in a case of adopting a separated transmitter/receiver antenna system (that is, a configuration in which the transmitter antenna and the receiver antenna are separately provided) such as the MIMO radar in the comparative example of the present embodiment, the quality of an image may deteriorate or a desired resolution may not be able to be achieved even when the degree of contribution is high under the condition that a spherical wave as a radar wave cannot be sufficiently approximated to a plane wave. Such a situation frequently occurs in an environment (near environment) where the distance to the object is very short as in the security inspection system (millimeter wave security) described above.

Figure 12:
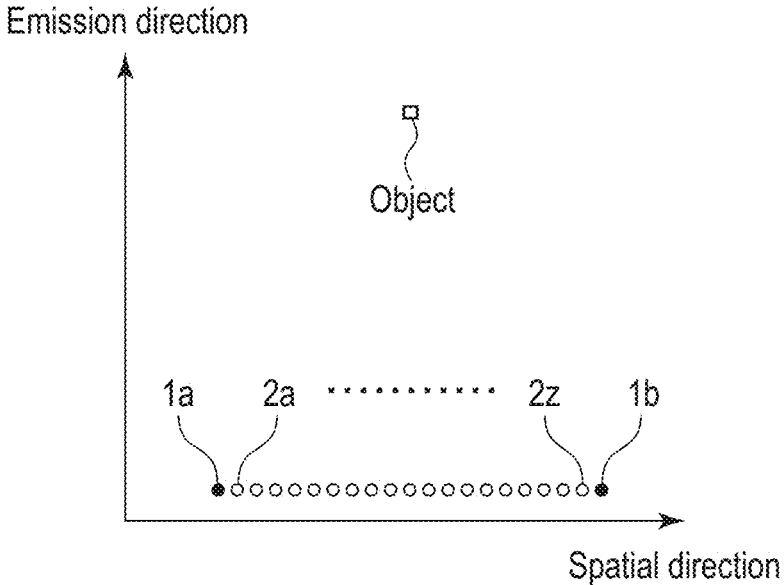
FIG. 12 is a diagram for explaining a comparative example of the present embodiment.

Here, a comparative example of the present embodiment in which MIMO radar arrangement including the transmitter antennas 1a and 1b and the receiver antennas 2a to 2z as illustrated in FIG. 12 is adopted will be described. In such a comparative example of the present embodiment, in a case where the distance to the object is sufficiently large (the object is sufficiently far) as illustrated in FIG. 13, the radar signal processing is executed on an observation signal 1 obtained by the transmitter antenna 1a emitting the radar signal and an observation signal 2 obtained by the transmitter antenna 1b emitting the radar signal, whereby a suitable imaging result for the object can be obtained, and a desired spatial resolution can be achieved in the imaging result.

Next, spatial resolution in a case where the comparative example of the present embodiment is applied in an environment where the distance to the object is very short as described above will be described with reference to FIG. 14.

In this case, FIG. 14 illustrates the observation signals 1 and 2 having the high degree of contribution (high correlation value) as reflection components from the object. However, referring to FIG. 14, since the spherical wave cannot be sufficiently approximated to the plane wave as described above, even when a radar image 1 generated by executing the radar signal processing on the observation signal 1 and a radar image 2 generated by executing the radar signal processing on the observation signal 2 are synthesized, an object image is broken into a plurality of pieces, and the object cannot be correctly imaged.

On the other hand, in a case where the present embodiment is applied in an environment where the distance to the object is very short, a desired spatial resolution can be achieved in the radar image 1 (that is, imaging with only the observation signal 1) generated by executing the radar signal processing (calculating a spatial correlation of each observation signal for the complex region) on the observation signal 1 received in the first group (a group of the transmitter antenna 1a and the receiver antennas 2a to 2m) and the radar image 2 (that is, imaging with only the observation signal 2) generated by executing the radar signal processing (calculating a spatial correlation of each observation signal for the complex region) on the observation signal 2 received in the second group (a group of the transmitter antenna 1b and the receiver antennas 2n to 2z). In the present embodiment, by performing the complex region synthesis or image region synthesis (or image combination) on the radar images 1 and 2 generated in this manner, it is possible to avoid deterioration of imaging while reducing the calculation amount. In FIG. 15, a case where the image region synthesis is performed on the radar images 1 and 2 is assumed.

Figure 16:
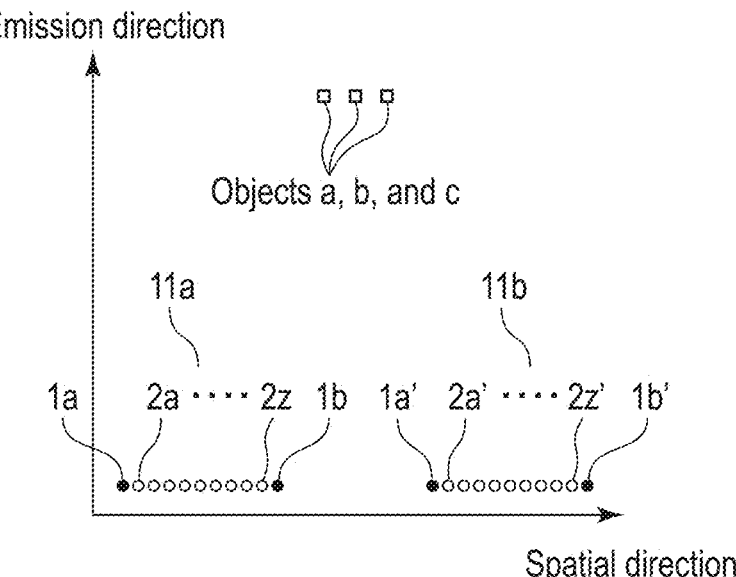
FIG. 16 is a diagram for explaining an example in which imaging of the object is performed using a plurality of radar devices.

Furthermore, as illustrated in FIG. 16, the present embodiment may be applied to a case where imaging of an object is performed using a plurality of radar devices (MIMO radars). In FIG. 16, for example, the transmitter antennas 1a and 1b and the receiver antennas 2a to 2z included in a first radar device (first MIMO radar) 11a are set as the first group, and transmitter antennas 1a' and 1b' and receiver antennas 2a' to 2z' included in a second radar device (second MIMO radar) 11b are set as the second group. In FIG. 16, a case where three objects a to c exist is assumed.

In this case, as illustrated in FIG. 17, the radar image 1 (imaging result 1) generated by executing the radar signal processing on the observation signal 1 received in the first group by performing observation in the first radar device 11a and the radar image 2 (imaging result 2) generated by executing the radar signal processing on the observation signal 2 received in the second group by performing observation in the second radar device 11b are synthesized (that is, cooperative imaging is performed between the groups).

As the cooperative imaging in this case, for example, the above-described complex region synthesis or image region synthesis can be selected.

Here, in a case where three objects a to c exist as described above, in the first and second radar images generated by executing the radar signal processing in the first and second groups, objects present at positions far from each of the first and second groups cannot be appropriately imaged. That is, the object c disappears in the radar image 1, and the object a disappears in the radar image 2.

In a case where the complex region synthesis is performed on such first and second radar images, an effect of improving spatial resolution can be obtained. In addition, since a lost object appears in a result of the complex region synthesis, it is also possible to obtain a blind spot reduction effect.

On the other hand, in a case where the image region synthesis is performed on the first and second radar images, an effect of reducing a noise level can be obtained. In addition, since a lost object appears in a result of the image region synthesis, it is also possible to obtain a blind spot reduction effect.

That is, in a case where the first and second radar images are synthesized in order to perform imaging of the three objects a to c illustrated in FIGS. 16 and 17, either the complex region synthesis or the image region synthesis may be adopted.

Here, an example of a radar image synthesis method applied in a case where the radar system 10 is operated in an environment in which the object 10a (for example, a person) moves toward the radar module 3 as described in FIG. 9 will be described with reference to FIG. 18.

As illustrated in FIG. 18, for example, in a case where the object (person) 10a is present at the position at the distance a from the radar module 3, (all of) the plurality of antennas included in the radar module 3 are caused to be cooperatively operated as one group, and a spatial correlation between observation signals of the respective antennas is calculated for a complex region, thereby generating a radar image.

On the other hand, for example, in a case where the object (person) 10a is present at the position at the distance b from the radar module 3, the first and second antenna groups of the plurality of antennas included in the radar module 3 are cooperatively operated as the first and second groups 31a and 31b. With this configuration, the first radar image is generated by calculating the spatial correlation between the observation signals of the antennas in the first group 31a for the complex region. In addition, the second radar image is generated by calculating the spatial correlation between the observation signals of the antennas in the second group 31b for the complex region. In a case of synthesizing the first and second radar images generated in this manner, it is possible to generate a synthetic radar image by applying, for example, the image region synthesis to the first and second radar images (cooperative imaging of the image region is performed).

Furthermore, for example, in a case where the object (person) 10a is present at the position at the distance c from the radar module 3, the first to third antennas of the plurality of antennas included in the radar module 3 are cooperatively operated as the first to third groups 32a to 32c. With this configuration, the first radar image is generated by calculating the spatial correlation between the observation signals of the antennas in the first group 32a for the complex region. In addition, the second radar image is generated by calculating the spatial correlation between the observation signals of the antennas in the second group 32b for the complex region. Furthermore, a third radar image is generated by calculating the spatial correlation between the observation signals of the antennas in the third group 32c for the complex region. In a case of synthesizing the first to third radar images generated in this manner, it is possible to generate a synthetic radar image by applying, for example, the image region synthesis to the first to third radar images (cooperative imaging of the image region is performed).

Although it has been described here that the image region synthesis is applied to a plurality of radar images (cooperative imaging of the image region is performed between a plurality of groups), it is sufficient if the present embodiment is configured to apply, for example, the complex region synthesis, the image region synthesis, or the image combination selected according to an object (a distance to the object, the shape of the object, spatial resolution for the object, or the like).

That is, in the present embodiment, it is possible to obtain a synthetic radar image with higher accuracy by applying the complex region synthesis, the image region synthesis, or the image combination to a plurality of radar images generated by executing the radar signal processing on observation signals (radar echoes) received in each of a plurality of groups as described above.

In the present embodiment, the complex region synthesis, the image region synthesis, and the image combination described above may be combined to obtain a synthetic radar image.

FIG. 19 illustrates an example of the combination of the complex region synthesis, the image region synthesis, and the image combination that can be applied in the present embodiment. In FIG. 19, it is assumed that imaging of an object is performed using (the radar device 11 including) radar modules 301 to 304.

In the example illustrated in FIG. 19, a plurality of antennas included in the radar module 301 are cooperatively operated as one group, and a radar image A is generated by executing the radar signal processing on observation signals (radar echoes) received by the plurality of antennas.

In addition, a plurality of antennas included in the radar module 302 are divided into two groups, two radar images are generated by executing the radar signal processing on observation signals (radar echoes) received by (antenna groups belonging to) each of the two groups, and a radar image B is generated by further performing the complex region synthesis on the two radar images.

Furthermore, a plurality of antennas included in the radar module 303 are divided into two groups, two radar images are generated by executing the radar signal processing on observation signals (radar echoes) received by (antenna groups belonging to) each of the two groups, and a radar image C is generated by performing the image region synthesis on the two radar images.

In addition, a plurality of antennas included in the radar module 304 are divided into two groups, two radar images are generated by executing the radar signal processing on observation signals (radar echoes) received by (antenna groups belonging to) each of the two groups, and a radar image D is generated by performing the image combination on the two radar images.

Furthermore, in the example illustrated in FIG. 19, it is illustrated that a radar image AB is generated by further performing the complex region synthesis on the radar images A and B described above. In addition, it is illustrated that a radar image CD is generated by further performing the image region synthesis on the radar images C and D described above.

In the present embodiment, a configuration in which the plurality of pieces of synthesis processing (the complex region synthesis, the image region synthesis, and the image combination) as illustrated in FIG. 19 are repeatedly performed until one image is obtained is also possible.

Although a configuration in which a plurality of radar images generated by causing antenna groups to be cooperatively operated for each group are synthesized has been described here, the radar system 10 according to the present embodiment only needs to have a configuration in which the plurality of antennas included in the radar device 11 are driven in the first and second modes according to at least an object (that is, a plurality of antennas used for high-resolution imaging are divided into groups), and the radar image synthesis processing is not necessarily executed in the radar system 10 according to the present embodiment (that is, the radar image synthesis processing may be executed by an external device or the like outside the radar system 10).

Furthermore, in the present embodiment, it has been described that a MIMO radar including a plurality of transmitter antennas and a plurality of receiver antennas is used as the radar device 11, but the radar device 11 may also have a configuration in which, for example, a plurality of transmitter/receiver antennas capable of transmitting radar signals and receiving radar echoes based on reflected waves of the radar signals are arranged.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

With regard to the above-described embodiments, the following supplementary notes are further disclosed.

(1)

A radar system including:

a plurality of antennas configured to transmit radar signals and receive radar echoes based on reflected waves of the radar signals; and a processor configured to drive the antennas in first and second modes according to an object, wherein in a case of driving the antennas in the first mode, the processor is configured to cause the antennas to be cooperatively operated and image the object based on the radar echoes received by the antennas, in a case of driving the antennas in the second mode, the processor is configured to cause a first antenna group among the antennas to be cooperatively operated as a first group, image the object based on radar echoes received in the first antenna group, cause a second antenna group among the plurality of antennas to be cooperatively operated as a second group, and image the object based on radar echoes received in the second antenna group, and the second antenna group is at least partially different from the first antenna group.

(2)

The radar system according to (1), wherein some of the antennas are included in a first radar module, and the other some of the antennas are included in a second radar module disposed while being spaced apart from the first radar module.

(3)

The radar system according to (1), wherein some of the antennas are included in a first radar device, and the other some of the antennas are included in a second radar device different from the first radar device.

(4)

The radar system according to any one of (1) to (3), wherein the processor is configured to further perform imaging based on an imaging result for the object based on the radar echoes received in the first antenna group and an imaging result for the object based on the radar echoes received in the second antenna group.

(5)

The radar system according to any one of (1) to (4), wherein in a case of driving the antennas in a third mode, the processor is configured to image the object based on the radar echoes received in the first antenna group and image the object based on the radar echoes received in the second antenna group, and cause a third antenna group among the antennas to be cooperatively operated as a third group and image the object based on radar echoes received in the third antenna group, and the third antenna group is at least partially different from the first and second antenna groups.

(6)

The radar system according to any one of (1) to (5), wherein the first and second modes are switched according to a distance between the object and the antennas or a shape of the object.

(7)

The radar system according to (6), further including a sensor configured to measure the distance between the object and the antennas or the shape of the object.

(8)

The radar system according to (7), wherein the processor is configured to perform switching between the first and second modes based on mode information indicating a correspondence relationship between a result of the measurement and a mode determined based on the result of the measurement.

(9)

The radar system according to (5), wherein the first mode is selected in a case where a distance between the object and the antennas is equal to or larger than a first predetermined value, the second mode is selected in a case where the distance between the object and the antennas is smaller than the first predetermined value and equal to or larger than a second predetermined value, the third mode is selected in a case where the distance between the object and the antennas is smaller than the second predetermined value, the first predetermined value is a value larger than the second predetermined value, and the first and second predetermined values are determined based on spatial resolution implemented in the radar system.

(10)

A radar system including: a plurality of antennas configured to transmit radar signals and receive radar echoes based on reflected waves of the radar signals; and a processor configured to cause a first antenna group among the antennas to be cooperatively operated as a first group, image an object based on radar echoes received in the first antenna group, cause a second antenna group among the antennas to be cooperatively operated as a second group, and image the object based on radar echoes received in the second antenna group, in a case where a distance between an object and the antennas is smaller than a predetermined value, wherein the second antenna group is at least partially different from the first antenna group.

What is claimed is:

1. A radar system comprising:
a plurality of antennas configured to transmit radar signals and receive radar echoes based on reflected waves of the radar signals; and
a processor configured to drive the antennas in first and second modes according to an object,
wherein:
in a case of driving the antennas in the first mode, the processor is configured to cause the antennas to be cooperatively operated and to image the object based on the radar echoes received by the antennas,
in a case of driving the antennas in the second mode, the processor is configured to (i) cause a first antenna group among the antennas to be cooperatively operated as a first group and a second antenna group among the antennas to be cooperatively operated as a second group, (ii) image the object based on first radar echoes received in the first antenna group, and (iii) image the object based on second radar echoes received in the second antenna group, and
the second antenna group includes at least one antenna, from among the plurality of antennas, that is not included in the first antenna group.

2. The radar system according to claim 1, wherein:
some of the antennas are included in a first radar module, and
a remainder of the antennas other than the some of the antennas are included in a second radar module disposed at a position spaced apart from the first radar module.

3. The radar system according to claim 1, wherein:
some of the antennas are included in a first radar device, and
a remainder of the antennas other than the some of the antennas are included in a second radar device provided separately from the first radar device.

4. The radar system according to claim 1, wherein the processor is further configured to perform imaging based on an imaging result for the object based on the radar echoes received in the first antenna group and an imaging result for the object based on the radar echoes received in the second antenna group.

5. The radar system according to claim 1, wherein:
in a case of driving the antennas in a third mode, the processor is configured to image the object based on the first radar echoes received in the first antenna group and to image the object based on the second radar echoes received in the second antenna group, to cause a third antenna group among the antennas to be cooperatively operated as a third group, and to image the object based on third radar echoes received in the third antenna group, and
the third antenna group includes at least one antennas, from among the plurality of antennas, that is not included in the first and second antenna groups.

6. The radar system according to claim 5, wherein:
the first mode is selected in a case where a distance between the object and the antennas is equal to or larger than a first predetermined value,
the second mode is selected in a case where the distance between the object and the antennas is smaller than the first predetermined value and equal to or larger than a second predetermined value, the third mode is selected in a case where the distance between the object and the antennas is smaller than the second predetermined value, the first predetermined value is a value larger than the second predetermined value, and the first and second predetermined values are determined based on a spatial resolution implemented in the radar system.

7. The radar system according to claim 1, wherein the first and second modes are switched according to a distance between the object and the antennas or a shape of the object.

8. The radar system according to claim 7, further comprising a sensor configured to measure the distance between the object and the antennas or the shape of the object.

9. The radar system according to claim 8, wherein the processor is configured to perform switching between the first and second modes based on mode information indicating a correspondence relationship between a result of the measurement and a mode determined based on the result of the measurement.

10. The radar system according to claim 1, wherein the first antenna group and the second antenna group share at least one antenna in common.

11. A radar system comprising:

a plurality of antennas configured to transmit radar signals and receive radar echoes based on reflected waves of the radar signals; and a processor configured to, in a case where a distance between an object and the antennas is smaller than a predetermined value, (i) cause a first antenna group among the antennas to be cooperatively operated as a first group and a second antenna group among the antennas to be cooperatively operated as a second group, (ii) image the object based on first radar echoes received in the first antenna group, and (iii) image the object based on second radar echoes received in the second antenna group, wherein the second antenna group includes at least one antennas, from among the plurality of antennas, that is not included in the first antenna group.

* * * * *